(12) United States Patent
Eikelenboom

(10) Patent No.: US 8,562,236 B2
(45) Date of Patent: Oct. 22, 2013

(54) ARTICULATED DEVICE

(75) Inventor: Pieter Arie Jan Eikelenboom, Rotterdam (NL)

(73) Assignee: Pieter Arie Jan Eikelenboom, Rotterdam (NL)

( * ) Notice: Subject to any disclaimer, the term of this patent is extended or adjusted under 35 U.S.C. 154(b) by 322 days.

(21) Appl. No.: 12/936,076

(22) PCT Filed: Apr. 1, 2009

(86) PCT No.: PCT/NL2009/000076
§ 371 (c)(1),
(2), (4) Date: Dec. 22, 2010

(87) PCT Pub. No.: WO2009/123439
PCT Pub. Date: Oct. 8, 2009

(65) Prior Publication Data
US 2011/0097138 A1    Apr. 28, 2011

(30) Foreign Application Priority Data

Apr. 1, 2008 (NL) .................................... 2001425

(51) Int. Cl.
*F16D 1/12* (2006.01)
(52) U.S. Cl.
USPC .................................. 403/81; 16/354; 16/221
(58) Field of Classification Search
USPC ............ 52/65; 16/354, 233, 221, 239; 403/81
See application file for complete search history.

(56) References Cited

U.S. PATENT DOCUMENTS

| 4,030,102 A | 6/1977 | Kaplan et al. |
| 6,313,811 B1 | 11/2001 | Harless |
| 6,323,827 B1 | 11/2001 | Gilger et al. |
| 7,644,721 B2 * | 1/2010 | Hoberman et al. ........... 135/144 |
| 8,312,596 B2 * | 11/2012 | Self ................. 16/354 |
| 2001/0037538 A1 | 11/2001 | Duperray et al. |
| 2003/0140589 A1 | 7/2003 | Yamawaki |
| 2006/0169425 A1 | 8/2006 | Long |
| 2007/0094846 A1 * | 5/2007 | Ishida ............................ 16/354 |

FOREIGN PATENT DOCUMENTS

| EP | 0 026 021 A | 4/1981 |
| FR | 2 886 718 A | 12/2006 |

OTHER PUBLICATIONS

International Search Report—Application No. PCT/NL2009/000076; Dec. 30, 2009.
NL Search Report—NL Application No. 2001425; Nov. 11, 2008.

* cited by examiner

*Primary Examiner* — Jeanette E Chapman
*Assistant Examiner* — Daniel Kenny
(74) *Attorney, Agent, or Firm* — Hoffmann & Baron, LLP

(57) ABSTRACT

An articulated device comprises a first member that is provided with a first set of teeth fixedly connected thereto. A second adjacent member is provided with a second set of teeth fixedly connected thereto. A coupling section is also provided on which the first set of teeth is hingeably supported around a first hinge axis and on which the second set of teeth is hingeably supported around a second hinge axis wherein the first set of teeth engages with the second set of teeth. A positioning device sets an angular position of the first and second members relative to the coupling section.

23 Claims, 30 Drawing Sheets

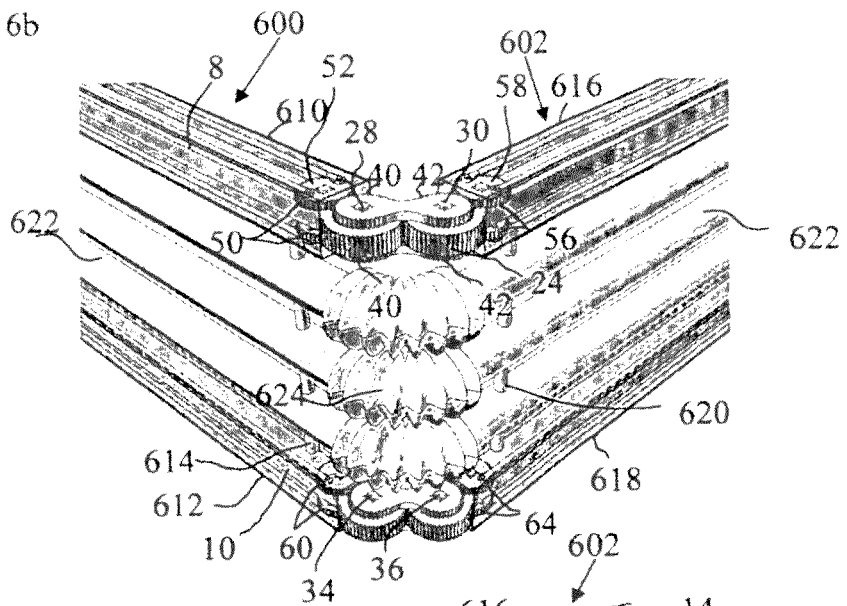

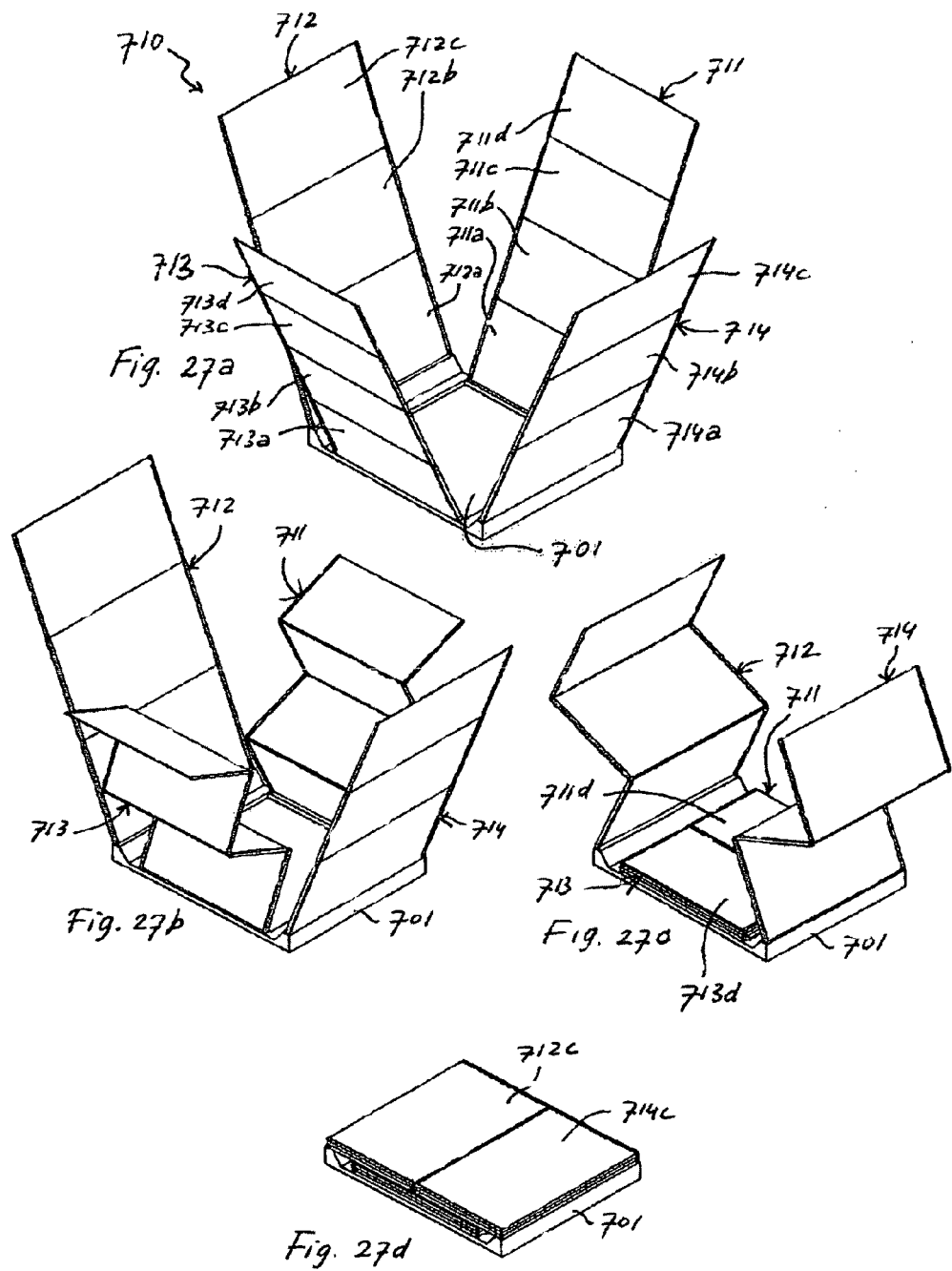

ARTICULATED DEVICE

CROSS-REFERENCE TO RELATED APPLICATIONS

This application is the National Stage of International Application No. PCT/NL2009/000076, filed Apr. 1, 2009, which claims the benefit of Netherlands Application No. NL 2001425, filed Apr. 1, 2008, the contents of all of which is incorporated by reference herein.

FIELD OF THE INVENTION

The invention relates to an articulated device having at least two members.

BACKGROUND OF THE INVENTION

Articulated devices are known in the prior art. Such devices usually comprise members that can fold in and out relative to each other mainly in a concertina way (in other words: in a zigzag way). A guide can be used for a controlled movement of the members of the articulated device. The devices can be driven by one or more suitable actuators.

SUMMARY OF THE INVENTION

The present invention aims to provide a simple construction with which both without and with a guide or similar means a movement such as a concertina movement or a rolling-up movement of the members of an articulated device can be obtained.

According to the invention an articulated device is provided, comprising: a first member that is provided with a first set of teeth fixedly connected thereto; a second member that is provided with a second set of teeth fixedly connected thereto; a coupling section on which the first set of teeth is hingeably supported around a first hinge axis and on which the second set of teeth is hingeably supported around a second hinge axis, the first set of teeth engaging with the second set of teeth; and a positioning device for setting an angular position of the first and second members relative to the coupling section. The positioning device is adapted to exert a force on the coupling section relative to at least one of the members for causing the coupling section to hinge around the hinge axis connecting the coupling section to the member.

In another aspect of the invention an articulated device having at least three members is provided, comprising: a first member that is provided with a first set of teeth fixedly connected thereto; a second member that is provided with a second set of teeth fixedly connected thereto and a third set of teeth fixedly connected thereto; a first coupling section on which the first set of teeth is hingeably supported around a first hinge axis and on which the second set of teeth is hingeably supported around a second hinge axis, the first set of teeth engaging with the second set of teeth; a third member that is provided with a fourth set of teeth fixedly connected thereto; a second coupling section on which the third set of teeth is hingeably supported around a third hinge axis and on which the fourth set of teeth is hingeably supported around a fourth hinge axis, the third set of teeth engaging with the fourth set of teeth; and a positioning device for setting an angular position of the first and second members relative to the first coupling section and setting an angular position of the second and third members relative to the second coupling section.

The device can be applied in the area of doors, fences, screens, solar panels, sunlight concentrators and every other area in which a series of members that, for example, have rod-like, plate-like, fence-like or tube-like shaped members but which are not necessarily the same amongst each other relative to type or shape, or of the same size or the same strength, are to be moved from a position in which they are on top of (or next to) each other (or also: stacked) to a position in which they are in each other's extension (or also: one after the other or adjacent to each other and not necessarily in each other's extension) or need to be moved in an opposite direction. The first member and the last member of a series of members may be interlinked by a coupling section such as has been described above, thus, obtaining an endless series of members.

BRIEF DESCRIPTION OF THE DRAWINGS

Further claims, features and advantages of the invention will become clear from the appended drawings in which non-limiting exemplary embodiments are shown wherein:

FIG. 6a is a partially exploded view in perspective of an embodiment of an articulated device according to the invention in a 'folded-out' condition;

FIG. 6b shows a perspective view of the embodiment of FIG. 6a at an enlarged scale in a partially 'folded-in' or partially 'folded-out' condition;

FIG. 6c shows another view in perspective of the embodiment of FIG. 6a at a diminished scale in the partially 'folded-in' or partially 'folded-out' condition according to FIG. 6b;

FIG. 8b is a plan view of the embodiment according to FIG. 8a;

FIG. 8c is a side view of the embodiment of FIG. 8a;

FIG. 9b is a plan view of the embodiment according to FIG. 8a in the intermediate position according to FIG. 9a;

FIG. 9c is a side view of the embodiment according to FIG. 8a in the intermediate position according to FIG. 9a;

FIG. 10b is a side view of the embodiment according to FIG. 8a in the intermediate position according to FIG. 10a;

FIG. 11b illustrates in perspective an assembled coupling element for use in the articulated construction of FIG. 11a;

FIG. 27a is a perspective view of a further embodiment of an articulated device according to the invention in 'folded-out' condition;

FIG. 27b is a perspective view of the embodiment of the articulated device according to FIG. 27a in a partially 'folded-in' or partially 'folded-out' condition;

FIG. 27c is a perspective view of the embodiment of the articulated device according to FIG. 27a in a partially 'folded-in' or partially 'folded-out' condition; and FIG. 27d is a perspective view of the embodiment of the articulated device according to FIG. 27a in a 'folded-in' condition.

In the different figures the same reference numbers relate to the same components or components having the same function.

DETAILED DESCRIPTION OF THE INVENTION

Figure 1:
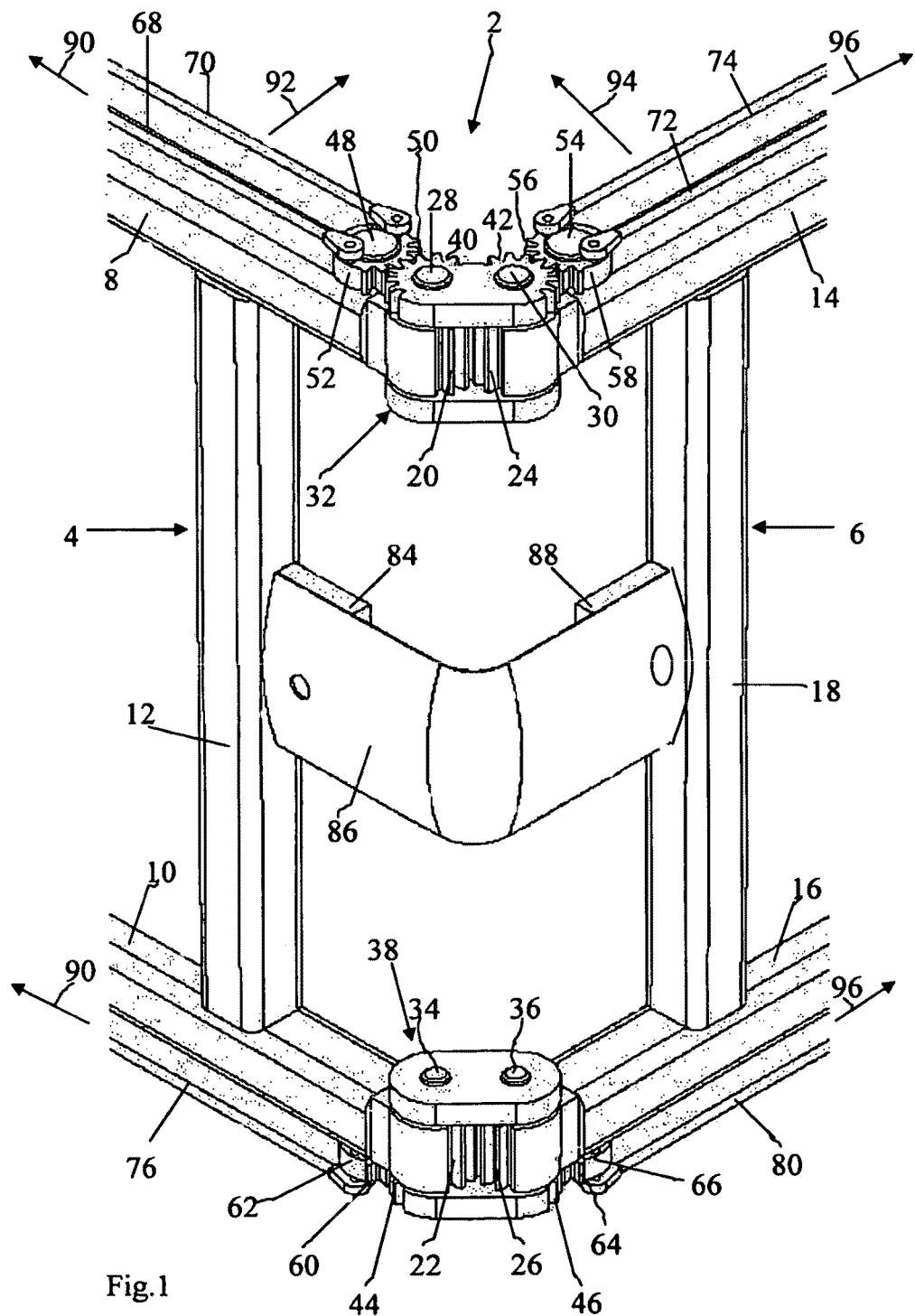
FIG. 1 is a perspective view of a section of an embodiment of an articulated device according to the invention in an intermediate position.

FIG. 1 shows a section of an articulated device 2 that comprises a first member 4 and a second member 6. The member 4 comprises a frame having interlinked bars 8, 10 and 12 and the member 6 comprises a frame having interlinked bars 14, 16 and 18. The bars 8, 10, 14 and 16 are each provided with a respective set of teeth 20, 22, 24 and 26 fixedly connected thereto at an end thereof. The bars 8 and 14 are hingeably supported around respectively hinge axes 28 and 30 in a coupling section 32, the sets of teeth 20 and 24 mutually engaging. The bars 10 and 16 are hingeably supported around respective hinge axes 34 and 36 in a coupling section 38, the sets of teeth 22 and 26 mutually engaging.

Positioning devices are provided for setting an angular position between the members 4, 6. To that end, the coupling sections 32 and 38 are provided with sets of teeth 40, 42, 44 and 46 fixedly connected thereto (for example, integrally formed). A positioning element 52 is provided hingeably supported around a hinge axis 48 and provided with a set of teeth 50, on bar 8 of member 4 near an end of the bar 8. A positioning element 58 is also provided hingeably supported around a hinge axis 54 and provided with a set of teeth 56, on bar 14 of member 6 near an end of the bar 14. In a similar way, a positioning element 62 is provided hingeably supported around a hinge axis (not shown) and provided with a set of teeth 60, on bar 10 of member 4 near an end of the bar 10. Further, a positioning element 66 is provided hingeably supported around a hinge axis (not shown) and provided with a set of teeth 64, on bar 16 of member 6 near an end of the bar 16. The sets of teeth 40 and 50 engage with each other as do the sets of teeth 42 and 56, the sets of teeth 44 and 60 and the sets of teeth 46 and 64.

The positioning element 52 is hingeably connected to drive elements 68 and 70 at a distance from the axis of rotation thereof. In a similar way, the positioning elements 58, 62 and 66 are respectively hingeably connected to drive elements 72 and 74, drive elements 76 and 78 (not shown) and drive elements 80 and 82 (not shown) at a distance from the axis of rotation thereof.

A support 84 is installed on the bar 12 of member 4, on which support an end of an elongated strip 86 is fixed. An opposite end of the strip 86 is fixed on a support 88 provided on the bar 18 of member 6. The strip 86 is curved over the length thereof viewed in the width direction, and is made from a flexible, elastic material. In FIG. 1, the strip 86 is shown in a bent condition wherein a tension is created in the strip 86 that tries to stretch the strip 86. When the members 4 and 6 take up a mutual position in which the strip 86 is stretched, a greater force should initially be generated when bending the strip 86 than after the strip 86 has already been bent to any degree. The strip 86 can, therefore, have a semi-blocking effect when it is stretched, wherein the members 4 and 6 are retained in the corresponding position when there is a lack of substantial hinge forces. This principle, for example, is applied in the wholly different technical field of flexible steel rules. For a further description reference is made here to FIG. 4.

With reference to FIG. 1, the operation of the articulated device 2 is as follows.

If it is assumed that a force is exerted on the drive element 68 in the direction of arrow 90, the positioning element 52 will rotate around the hinge axis 48 in the direction of arrow 92 as a consequence of the experienced moment. The bar 8 and therewith the member 4 will move in the direction of the arrow 92 relative to the coupling section 32 based on the engagement between the sets of teeth 40 and 50. The bar 14 and therewith the member 6 will move in the direction of arrow 94 relative to the coupling section 32 based on the engagement between the sets of teeth 20 and 24. Thus, the members 4 and 6 hingingly move towards each other when a force is exerted on the drive element 68 in the direction of the arrow 90. The hinging of the member 4 relative to the coupling section 32 takes place simultaneously and to the same (although directed in the opposite direction) degree as the hinging of the member 6 relative to the coupling section 32. A force can be exerted on the drive element 70 in an opposite direction to the one according to arrow 90 to increase the moment exerted on the positioning element 52 in the same direction. It is assumed within this context that the drive element 70 is sufficiently rigid to absorb a thrust. If the drive elements are soft (for example, they have been executed as cables, chains, etc.), then only traction forces can be exerted, and the drive elements 68 and 70 can only be operational separately and in the opposite direction relative to each other. In addition to the force in the direction of the arrow 90 that is exerted on the drive element 68, a force in the direction of arrow 90 can be exerted on drive element 76, and a force can be exerted on drive element 78 (not shown) in the opposite direction to the one according to arrow 90 when the rigidity of drive element 78 allows this.

The movement of the members 4 and 6 in the directions of the arrows 92, 94 obtained according to the previously described application of forces on the drive elements 68, 70, 76 and 78 can also be obtained by exerting a force on the drive elements 72 and 80 in the direction of arrow 96, which may be supplemented by a force directed in the opposite direction on the drive elements 74 and 82 (not shown). The previously described forces can also be exerted on any (that is to say, one) drive element 68, 70, 72, 74, 76, 78, 80, 82 or on any combination thereof (that is to say, two, three, four, five, six, seven or eight drive elements) to obtain the movement of the members 4 and 6 in the directions of the arrows 92, 94.

It should be clear that reversing the respective force directions of the drive elements implies that the members 4 and 6 will be articulated relative to coupling sections 32 and 38 in directions that are opposite to that according to the arrows 92, 94. The strip 86 has a pretension in the condition that is shown in FIG. 1 that supports a movement of the members 4 and 6 in the opposite directions to the directions 92, 94.

Figure 2:
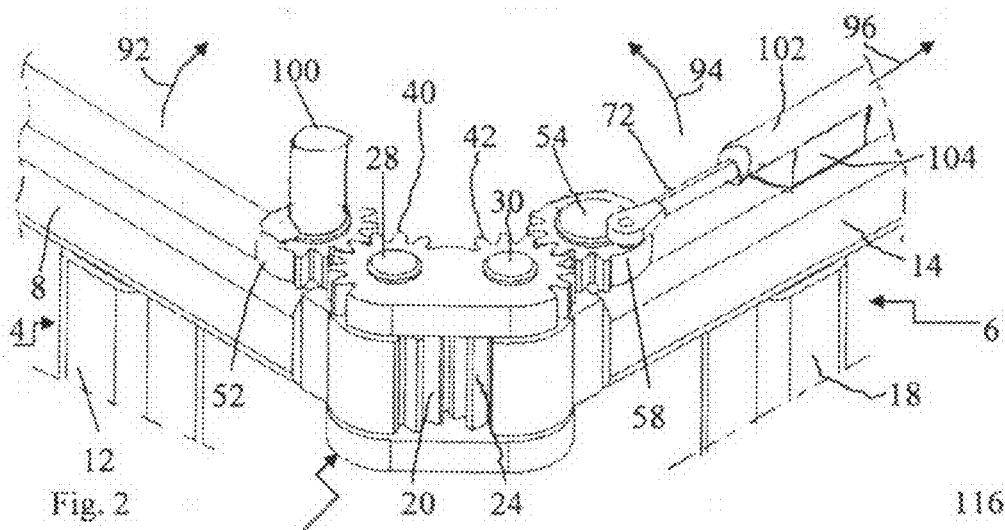
FIG. 2 is a perspective view of a section of another embodiment of an articulated device according to the invention in an intermediate position.

FIG. 2 illustrates embodiments of ways of driving the positioning elements 52, 58.

Positioning element 52 can be driven in a rotational manner by an actuator 100 that is arranged fixedly relative to the bar 8, and that can be of an electrical, hydraulic or pneumatic type to allow the members 4 and 6 to move in the directions 92, 94 or in opposite directions.

The drive element 72 is moved in the direction of arrow 96 or in the opposite direction through a dual acting cylinder/piston device 102 that is installed through a support 104 on bar 14 of member 6 in order to allow the members 4 and 6 to move in the directions of 92, 94 or in opposite directions. Instead of the cylinder/piston device 102, any actuator of an electrical, hydraulic or pneumatic type can be used as long as it is dual acting.

It should be clear that the actuator 100 in itself can bring about a movement of the members 4 and 6 in the directions 92, 94 or in opposite directions when the positioning element 58, the hinge axis 54, the set of teeth 42, the drive element 72, the cylinder/piston device 102 and the support 104 are not present. It should also be clear that the cylinder/piston device 102 or the like can bring about a movement of the members 4 and 6 in the directions 92, 94 or in opposite directions in combination with the drive element 72 and the positioning element 58 hingeable around the hinge axis 54, as such, when the actuator 100, the positioning element 52 and the set of teeth 40 are not present.

Figure 3:
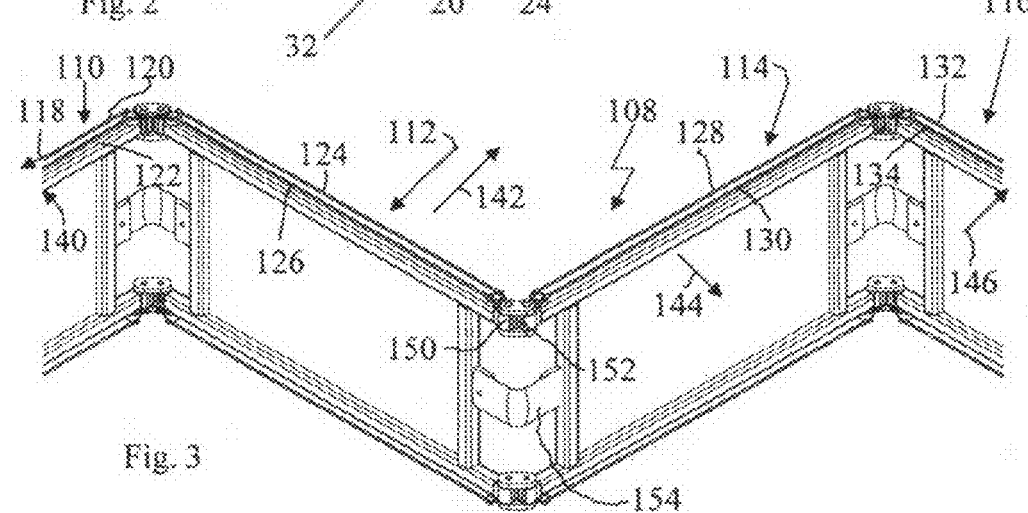
FIG. 3 is a perspective view of the articulated device according to FIG. 1 in an intermediate position wherein four members can be seen.

FIG. 3 shows an articulated device 108 having four members 110, 112, 114 and 116. Drive elements 120 and 122 are mounted on member 110. Drive elements 124 and 126 are mounted on member 112. Drive elements 128 and 130 are mounted on member 114, which drive elements interlink two positioning elements that belong to different coupling sections. Drive elements 132 and 134 are mounted on member 116, which drive elements also interlink two positioning elements that belong to different coupling sections.

Based on the principles explained previously with reference to FIG. 1, exerting a (traction) force in the direction of arrow 118 on drive element 122 will lead to movement in the members 110, 112, 114 and 116 in the directions of the respective arrows 140, 142, 144 and 146 in the embodiment of FIG. 3. The reason for this is that the traction force on the drive element 122 will lead to a traction force on drive element 124 by the geared couplings that are arranged in-between, that is, the geared coupling between the positioning element coupled to the drive element 122 and the coupling element on which the positioning element engages, the geared coupling between the member 110 and the member 112 in the coupling element, and the geared coupling between the coupling element and the positioning element that is coupled to the drive element 124. The traction force on the drive element 124 in turn leads to a traction force on drive element 130 due to the geared couplings that can be found in-between, that is the geared coupling between the positioning element coupled to the drive element 124 and the coupling element on which the positioning element engages, the geared coupling between the member 112 and the member 114 in the coupling element, and the geared coupling between the coupling element and the positioning element that is coupled to the drive element 130. The members 110, 112, 114 and 116 will, therefore, eventually be in each other's extension or can be further articulated relative to each other, if required, when the sets of teeth 20 and 24 are suitably designed (see FIG. 2) wherein teeth are provided over a larger section of the circumference than is shown in FIG. 2, and a suitable design of corresponding drive elements/control means, positioning elements and corresponding sets of teeth. When using drive elements, the traction force on the drive element 130 can, by the way, in turn lead to a traction force on drive element 132 by the geared couplings that are arranged in-between, and can make further members (not shown) connected to the member 116 be articulated away from each other.

It should be clear, that the same movements of the members 110, 112, 114 and 116 as described above, for example to bring them into each other's extension, can be brought about by exerting suitable forces on other drive elements having suitable actuation means (for example, the actuation means 100 or 102 according to FIG. 2) such as (as can be seen in FIG. 3) a force on drive elements 120, 126, 128 and/or 134 towards the right and/or a force on drive element 122, 124, 130 and/or 132 towards the left.

The drive elements and positioning elements that are shown in FIG. 3 at the bottom of the members 110, 112, 114 and 116, can be used in a similar way as the corresponding elements at the top of the members, but they can also be omitted without this negatively affecting the correct operation of the articulated device.

Figure 4:
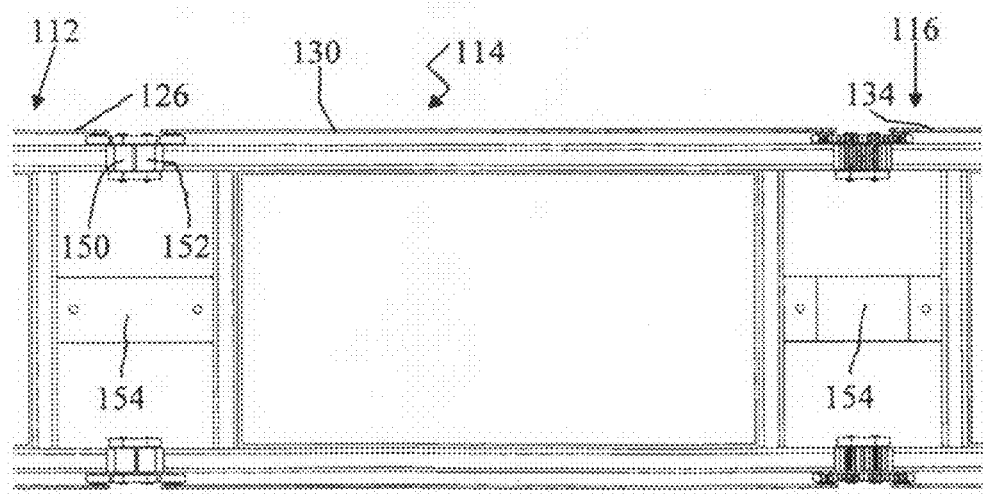
FIG. 4 is a side view of the articulated device according to FIG. 1 in an end position ('folded-out' condition) wherein the members are in each other's extension.

FIG. 4 shows a position of the members 112, 114 and 116 in each other's extension that is achieved when a force is exerted on the drive element 122 in the direction of arrow 118 in FIG. 3. Since all sets of teeth in the coupling sections such as, for example, is shown for sets of teeth 150, 152, have a finite length, the sets of teeth block in the shown end position and further articulation is impossible. Strips 154 are in the end position in a stretched condition, and thereby offer resistance against articulation in the coupling sections with an increased resistance when the articulation action is initiated.

Figure 5:
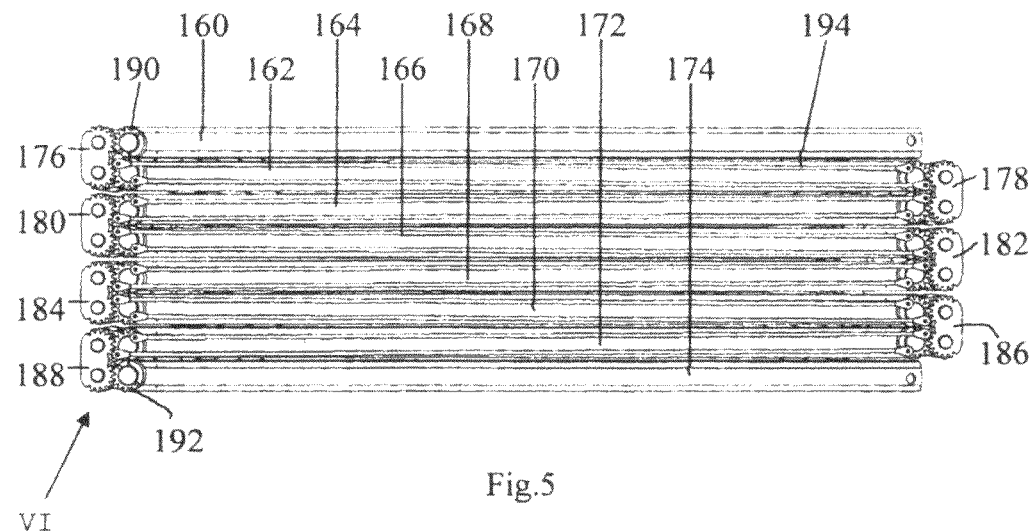
FIG. 5 is a perspective plan view of the articulated device according to FIG. 1 in another end position ('folded-in' condition) wherein eight members can be seen and the members are next to each other.
Figure 6:
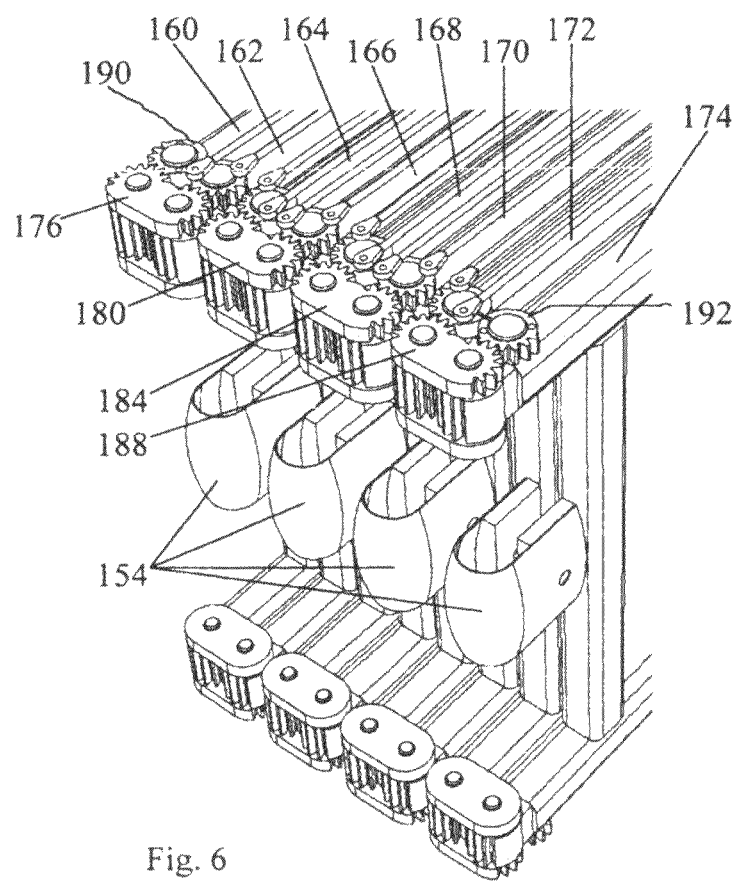
FIG. 6 is a perspective view of the device according to FIG. 5 seen in the direction of arrow VI in FIG. 5.

If the exertion of a force described by reference to FIG. 3 on the drive elements is reversed relative to its direction, the members 110, 112, 114, 116 will move in the opposite direction to the respective arrows 140, 142, 144, 146 until a second end position is obtained that is shown in FIGS. 5 and 6 for another number of members and in which the members of the articulated device lie next to each other.

FIGS. 5 and 6 show eight members 160, 162, 164, 166, 168, 170, 172 and 174 that are interlinked by seven top coupling sections 176, 178, 180, 182, 184, 186, 188 and seven bottom coupling sections of which only four are shown in FIG. 6. The rotational driving of one or more of the shown positioning elements, for example positioning element 190 or 192, with an actuator 100 (such as shown in FIG. 2) is sufficient to move the members 160-174 from the position next to each other to a position in each other's extension, and back, or to any intermediate position such as has been previously explained with reference to the previous figures. The same positioning can be obtained by exerting a suitable force on one or more of the shown drive elements, for example drive element 194, for example with a linear actuator.

The members can, as illustrated in the figures, comprise a frame 8, 10, 12 (FIG. 1) on which components can be mounted, but they can also form a whole with the components. The members can, for example, support panels including doors, fences and solar panels that can be folded in or out as required or that are to be moved once from a folded-in condition (FIG. 5) to a folded-out condition (FIG. 4), where the folded-out condition is fixed by the strips 86, 154.

Instead of the strip, 86, 154, other devices can also be applied that semipermanently fix the mutual angular position of the members of the articulated device in predetermined angular positions, for example both in a position in which the members are next to each other ('folded-in' condition) and in a position in which the members are in each other's extension ('folded-out' condition).

FIGS. 6a and 6b show two members 600, 602 of an articulated device, the members 600, 602 each comprising a frame that comprises hollow pipes 610, 612 and one or more connecting rods 614 between the pipes 610, 612, and that comprises hollow pipes 616, 618 and one or more connecting rods 620, respectively. As shown in FIG. 6c, the articulated device can comprise more than two members of which the frames are built up in a similar way.

The frame of each member of the articulated device supports one or more (hollow) pipes 622 (in the case of FIGS. 6a-6c, three parallel pipes 622) of which open ends are connected through flexible sleeves 624 to open ends of pipes 622 of another member to form articulated pipes. The pipes 622 are installed on the connecting rods 614, 620, for example because the connecting rods 614, 620 run through them. The connecting rods 614, 620 can, of course, also only extend between the pipes 622 and be connected thereon on the outside thereof.

For the folding in and out of the articulated device according to FIGS. 6a-6c, for example the mechanism that was previously shown in FIGS. 1-6 and described with reference thereto, is used. This emerges, in particular, from the reference numerals used in FIG. 6b, which are also included in FIG. 1 and the description corresponding thereto. It should be noted that the positioning devices of the embodiment according to FIGS. 6a-6c are dually executed: see, for example, the sets of teeth 40, 50 above and below the set of teeth 20 and the sets of teeth 42, 56 above and below the set of teeth 24. It is, of course, also possible to execute the positioning devices as single versions (for example, when relatively low forces are involved for making the members articulate relative to each other) wherein only a set of teeth 40 and 42 has been installed under the set of teeth 20 and 24, respectively. The pipes 610, 612, 616, 618 are fixedly connected to bars 8, 10, 14 and 16, respectively, in a manner that is not further shown.

The articulated device according to FIGS. 6a-6c can, for example, be used for transporting gasses or liquids, for example, water, foam or oil, or viscous masses such as concrete through the one or more pipes 622. The articulated device can, for example, be used on a vehicle such as on a fire brigade vehicle as part of a spraying device.

In the previously discussed embodiments and also in some embodiments still to be discussed below, the articulated device is moved in a similar way as a concertina from a folded-out condition to a folded-in condition, or from a folded-in condition to a folded-out condition. Consecutive articulated connections between members fold in and out alternatively on one side and the opposite side of a series of members. It is also possible to fold predetermined articulated connections in a predetermined direction (for example, consecutively folded in to one side, folded out and folded in to another side), to attain a predetermined folding pattern wherein articulated connections can take up a position between a folded-in condition and a folded-out condition, as required. It is further possible to execute the coupling elements between the different members in such a way that consecutive articulated connections between members all fold in and out on one side of the series of members, so that a wholly or partially rolling-up series of members is obtained.

Figure 7:
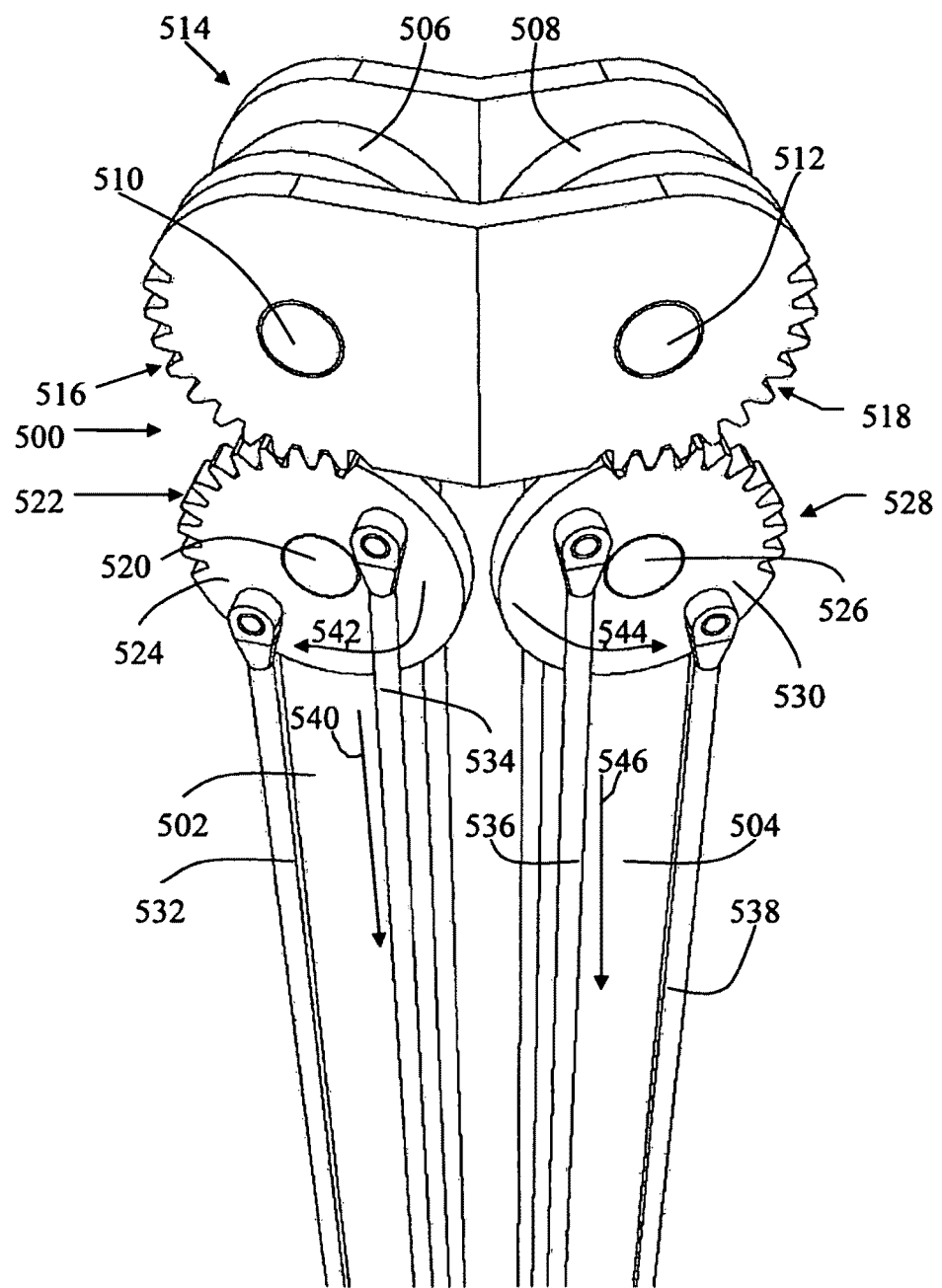
FIG. 7 is a perspective view of a section of an embodiment of an articulated device according to the invention in an end position ('folded-in condition') wherein the members are next to each other.

FIG. 7 shows a section of an articulated device 500 that comprises a first member 502 and a second member 504 each in the form of a rod, profile, etc. The members 502, 504 are each provided with a set of teeth 506, 508 (teeth are not shown in FIG. 7), respectively, fixedly connected thereon on an end thereof in a similar way as was previously explained within the scope of FIG. 1 and the figures that follow. The members 502, 504 are hingeably supported around respective hinge axes 510, 512 in a coupling section 514, wherein the sets of teeth 506 and 508 mutually engage. The angle between the hinge axes 510, 512 is greater than 0 degrees. In an embodiment the angle is between 5 degrees and 90 degrees, more in particular, between 5 and 60 degrees. The coupling section 514 is to that end made in a bent condition, wherein a first half that comprises the hinge axis 510 is directed at an angle that is smaller than 180 degrees relative to a second half that comprises the hinge axis 512. A bent design of the coupling section is, however, not essential as long as the angle between the hinge axes is more than 0 degrees.

As shown partially in FIG. 7, positioning devices for setting an angular position between the members 502, 504 are provided. To that end, the coupling section 514 is provided with sets of teeth 516 and 518 fixedly connected thereto (for example, integrally formed). A positioning element 524 hingeable around a hinge axis 520, and provided with a set of teeth 522 is supported on member 502 near the coupling section 514. Furthermore, a positioning element 530 hingeable around a hinge axis 526, and provided with a set of teeth 528, is supported on member 504 near the coupling section 514. The sets of teeth 516 and 522 engage with each other and the sets of teeth 518 and 528 engage with each other.

The positioning element 524 is hingeably connected to drive elements 532 and 534 at a distance from the hinge axis 520 thereof. In a similar way, the positioning element 530 is hingeably connected to drive elements 536 and 538 at a distance from the hinge axis 526 thereof.

With reference to FIG. 7, the operation of the articulated device 500 is as follows.

If it is assumed that a force is exerted on the drive element 534 in the direction of arrow 540, the positioning element 524 will rotate as a consequence of the experienced moment around the hinge axis 520 in the direction of arrow 542. Based on the engagement between the sets of teeth 522 and 516, the member 502 will move in the direction of the arrow 542 relative to the coupling section 514. Based on the engagement between the sets of teeth 506 and 508 the member 504 will move in the direction of arrow 544 relative to the coupling section 514. Thus, the members 502 and 504 are articulated away from each other when a force is exerted on the drive element 534 in the direction of the arrow 540. A force can be exerted on the drive element 532 in an opposite direction to that shown according to arrow 540 to increase the exerted moment on the positioning element 524 in the direction of the arrow 542. It is assumed within this context that the drive element 532 is sufficiently rigid to absorb a thrust. If the drive elements are soft (for example, provided as cables, chains, or the like), then only traction forces can be exerted and the drive elements 532 and 534 can only be operational separately from each other and in mutually opposite directions. The movement of the members 502, 504 in the directions of the arrows 542 and 544 obtained according to the previously described application of forces on the drive elements 532, 534 can also be obtained by exerting a force on the drive element 536 in the direction of arrow 546, which force may be supplemented with a force directed in the opposite direction on the drive element 538.

From the position shown in FIG. 7 wherein the angle between the members 502, 504 is mainly 0 degrees, the members 502 and 504 will each be able to articulate over 90 degrees relative to the coupling section 514 by the exertion of force on at least one drive element, after which the angle between the (longitudinal direction of the) members 502, 504, viewed in a plane through the hinge axes 510, 512, is mainly the same as the angle between the hinge axes. The angle between the members 502, 504 viewed in a plane at right angles to the aforementioned plane (and also at right angles to the plane of symmetry of the shown construction) then mainly is 180 degrees.

It should be clear that reversing the respective force directions for the drive elements will lead to the members 502, 504 moving in a direction that is the opposite of that according to the arrows 542 and 544 relative to the coupling section 514, insofar the different sets of teeth and other constructional limitations to that end provide possibilities.

The basic construction according to FIG. 7 offers the option of forming a ring-shaped construction of members that are connected through coupling sections at the ends thereof. This is illustrated in FIGS. 8a, 8b, 8c, 9a, 9b, 9c, 10a and 10b. It should be noted that no positioning devices are shown in these figures, to clarify the structural basic construction. In a practical embodiment, however, such positioning devices will be present, wherein an embodiment can be selected that has been explained elsewhere in this description.

Figure 8A:
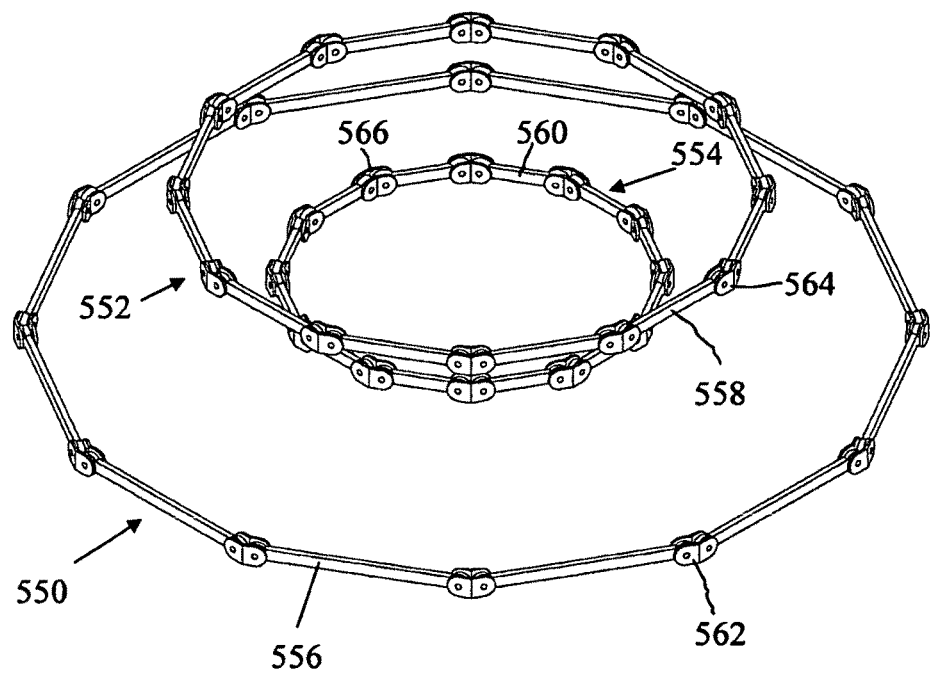
FIG. 8a is perspective view of an embodiment of an articulated device that comprises coupling sections according to FIG. 7 wherein the members form closed rings and the device is in an end position ('folded-out condition')
Figure 8B:
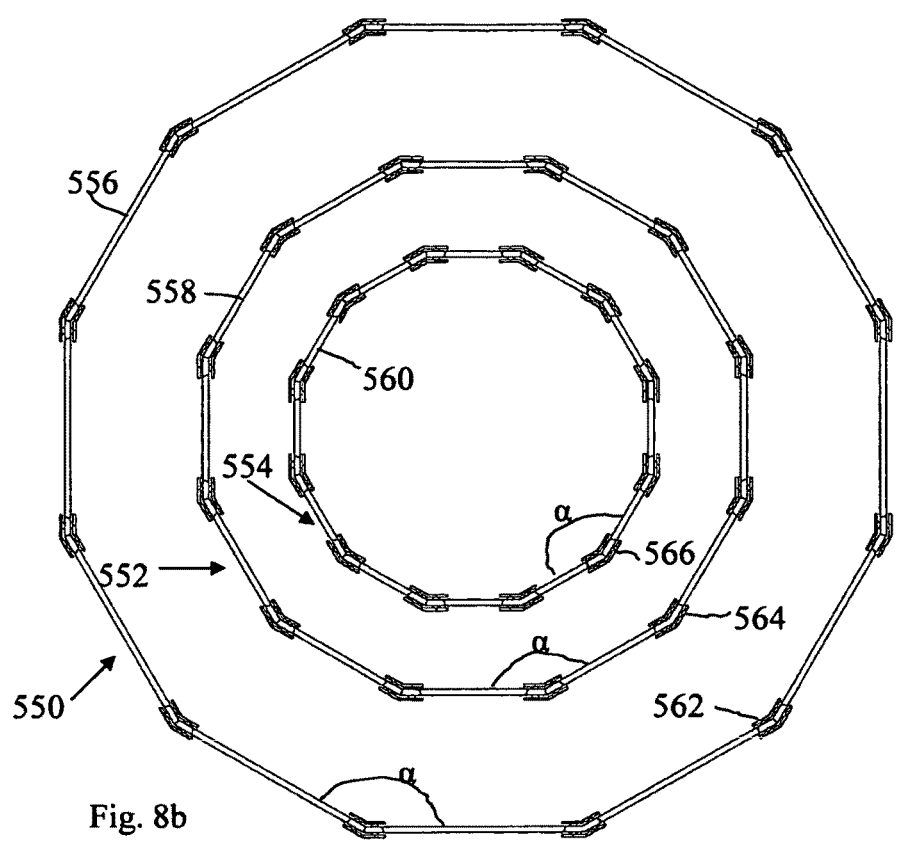
Figure 8C:
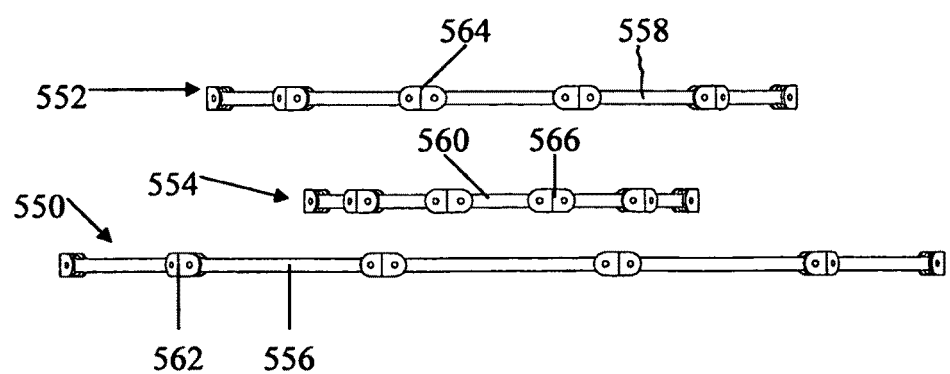

FIGS. 8a, 8b and 8c show three ring-shaped constructions 550, 552 and 554 that each comprise twelve members 556, 558 and 560, respectively, that are interlinked by twelve coupling sections 562, 564 and 566, respectively. The angle α (FIG. 8b) between (the longitudinal direction of) the members 556, 558 and 560, viewed in the plane of the construction such as shown in 'folded-out' condition, is substantially equal to 180 degrees minus the angle between the hinge axes of the coupling elements, which is 30 degrees in this exemplary embodiment. This means that in FIG. 7 the angle α equals 150 degrees. The angle α generally amounts to (180-360/n) degrees in an arrangement of n (n>3) identical members and coupling elements. Viewed in side view according to FIG. 8c, the angles between the members 556 amongst each other, the members 558 amongst each other and the members 560 amongst each other are equal to 180 degrees.

In any one of the constructions 550, 552 and 554, the respective coupling sections 562, 564 and 566 have been placed alternatingly in such a way that an articulating movement of a respective member 556, 558 and 560 is opposite relative to the two coupling sections connected thereon on the ends. Thus, a zigzag orientation of the members is obtained.

The ring-shaped constructions 550, 552 and 554 can, for example, be part of a foldable construction with which a flexible material can be tensioned. Below, the folding in of the constructions 550, 552 and 554 is illustrated based on FIGS. 9a, 9b, 9c, 10a and 10b.

Figure 9A:
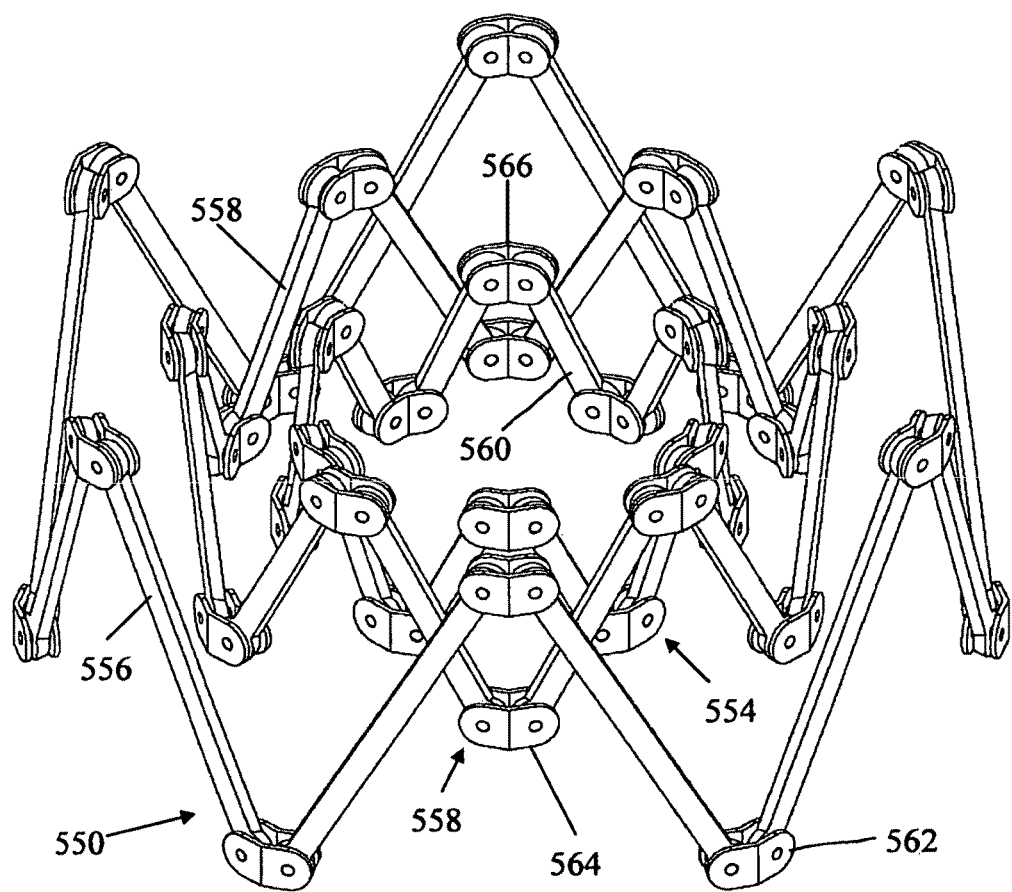
FIG. 9a is a perspective view of the articulated device in the embodiment according to FIG. 8a in an intermediate position.
Figure 9B:
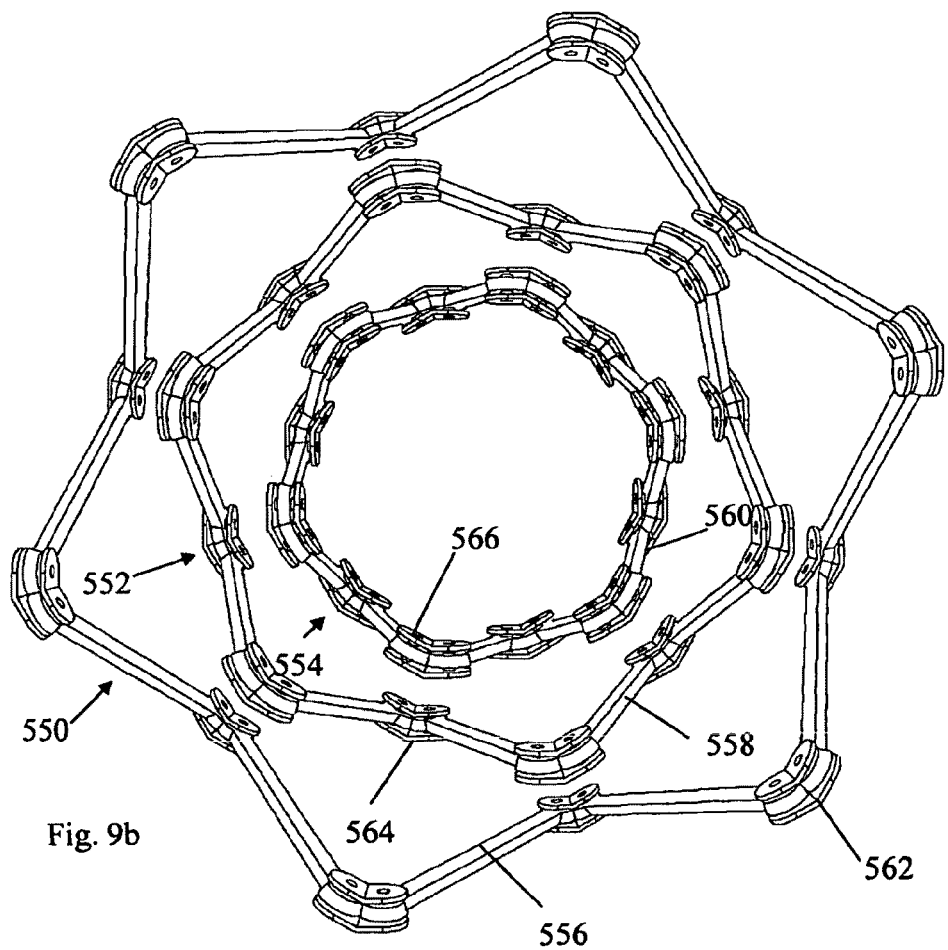
Figure 9C:
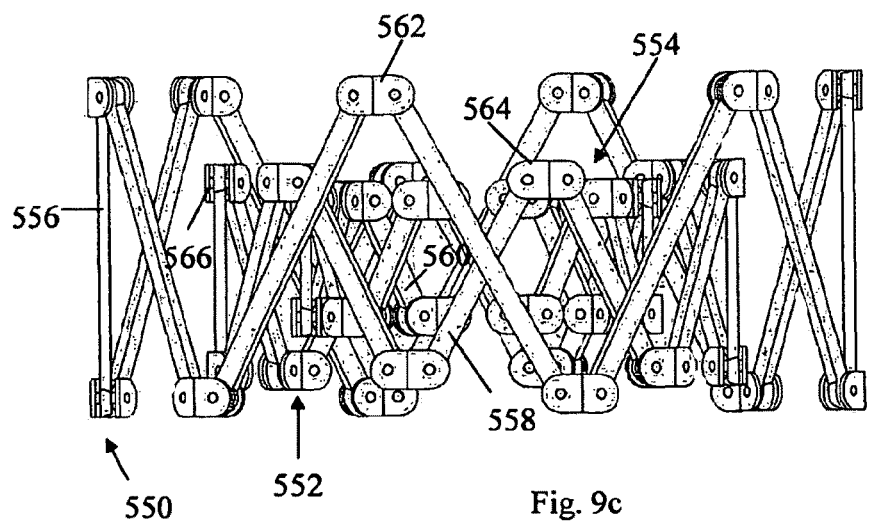

As FIGS. 9a, 9b and 9c show, at the location of coupling elements 562 the members 556 of the construction 550 are hingeable relative to the coupling element and relative to each other. Thus, the construction 550 is partially folded in from the position shown in FIGS. 8a, 8b and 8c ('folded-out' condition) to the position according to FIGS. 9a, 9b and 9c. The same applies to the constructions 552 and 554. The diametral dimensions of the ring-shaped constructions 550, 552 and 554 decreases due to this in FIG. 9a relative to FIG. 8a.

Figure 10A:
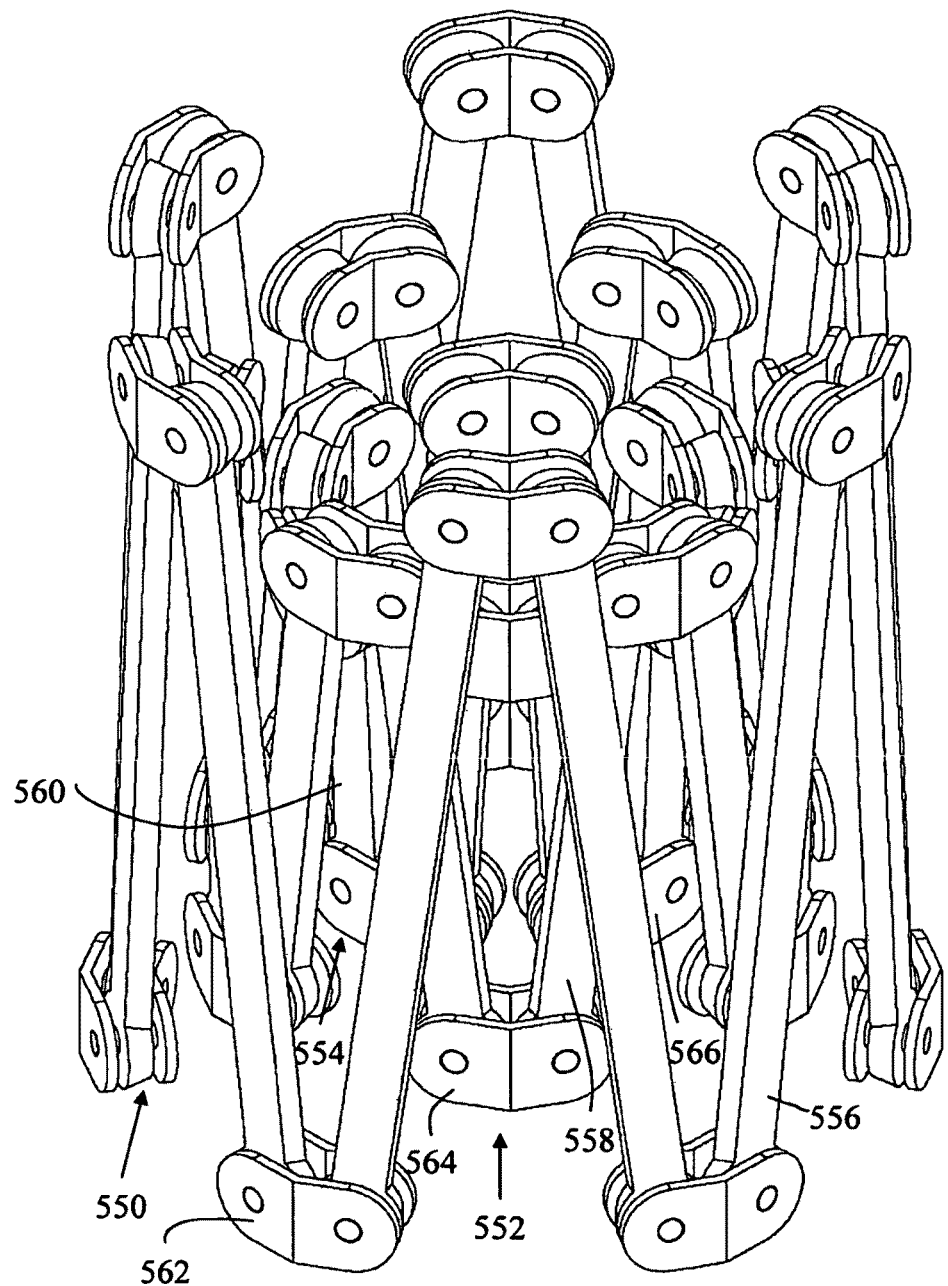
FIG. 10a is a perspective view of the articulated device in the embodiment according to FIG. 8a in another intermediate position.
Figure 10B:
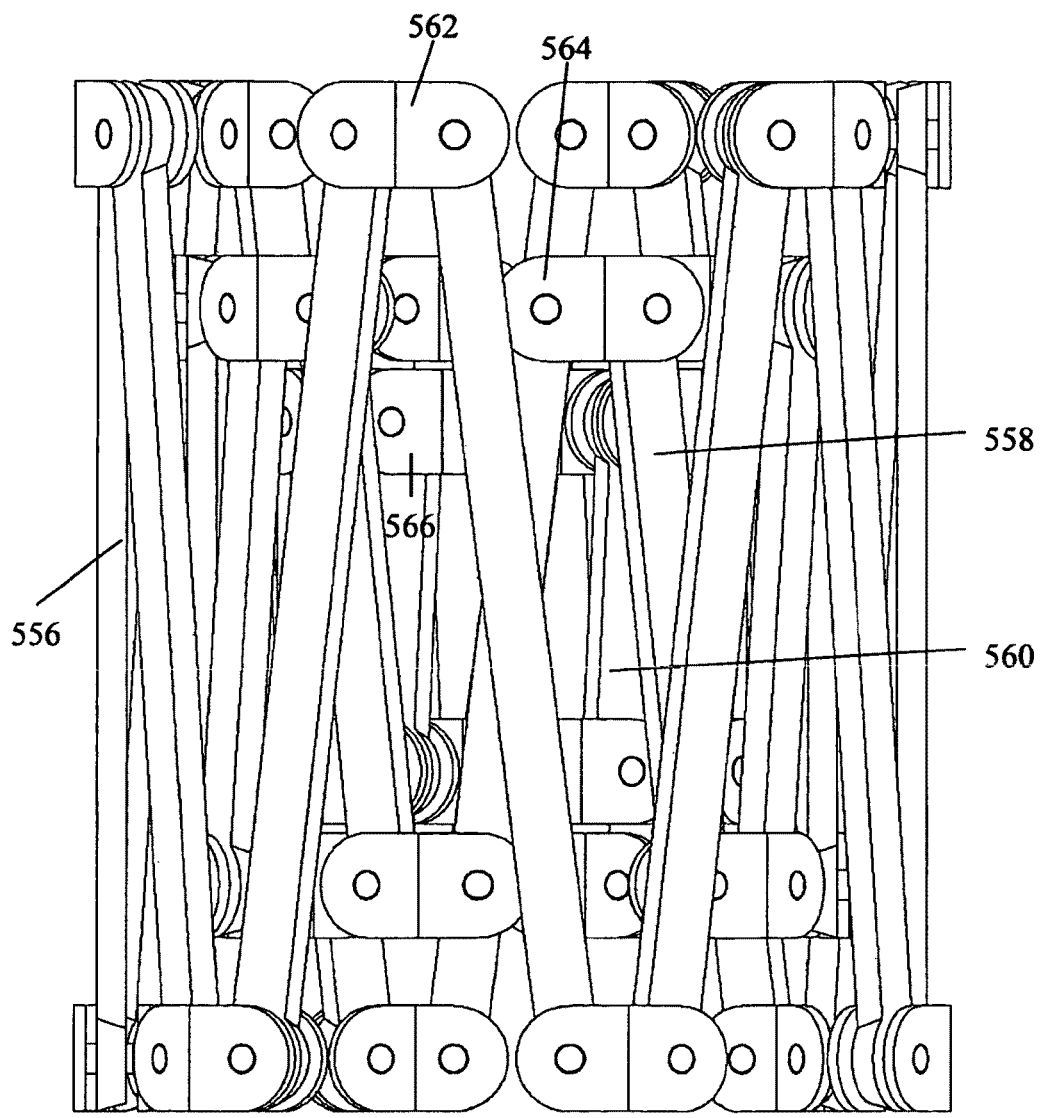

As is shown in FIGS. 10a and 10b, the members 556, 558 and 560 of the constructions 550, 552 and 554, respectively, can be made to articulate even further relative to the respective coupling elements 562, 564 and 566 until a substantially cylindrical unit is obtained in end positions of the constructions 556, 558 and 560, wherein the members of each construction extend substantially parallel to each other (compare with FIG. 7). Thus, the constructions can be folded in very compactly while they can cover a large area in the folded-out condition (FIGS. 8a, 8b and 8c). This is, in particular, advantageous in an aerospace application of the construction wherein compactness of the construction when bringing it into space is crucial, while a very large area can be formed and supported once it has arrived at its final destination. This is further explained based on FIGS. 11a, 11b and 11c.

Figure 11A:
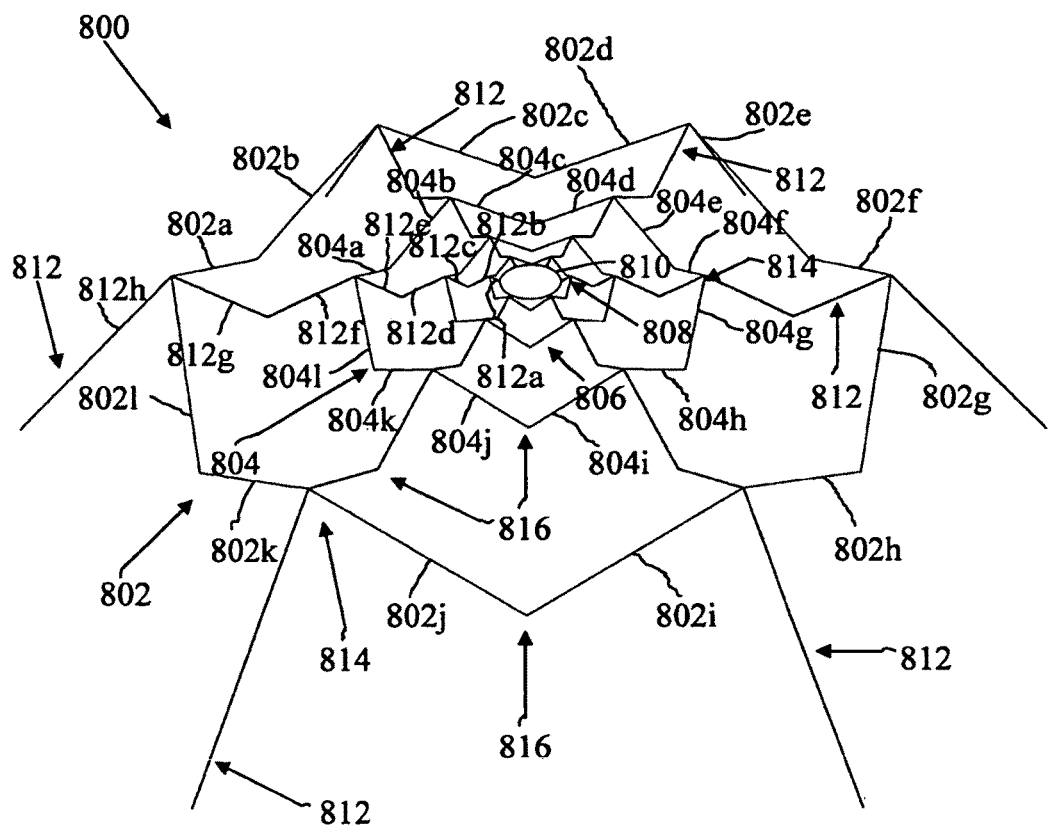
FIG. 11a illustrates in perspective an articulated construction according to the invention.

FIG. 11a schematically illustrates an articulated device 800 in an at least partially folded-out condition. The articulated device 800 comprises a ring-shaped series 802 of members 802a, 802b, 802c, 802d, 802e, 802f, 802g, 802h, 802i, 802j, 802k and 802l not shown in further detail that are consecutively interlinked by a coupling section that at least partially is of a similar type as the coupling section 514 such as is shown in FIG. 7, wherein the member 802a is connected to the member 802l. Furthermore, the articulated device 800 comprises a ring-shaped series 804 of members 804a, 804b, 804c, 804d, 804e, 804f, 804g, 804h, 804i, 804j, 804k and 804l not shown in further detail that are consecutively interlinked by a coupling section that at least partially is of a similar type as coupling section 514 such as is shown in FIG. 7, wherein the member 804a is connected to the member 804l. The articulated device 800 is provided with two further ring-shaped series 806 and 808, interlinked by coupling sections, members not shown in further detail having decreasing diameters and a central frame 810.

The series of members 802, 804, 806 and 808 that mainly extend in a tangential direction around the frame 810 are interlinked by series 812 of members 812a, 812b, 812c, 812d, 812e, 812f, 812g and 812h not shown in further detail that substantially extends in a radial direction relative to the frame 810, and that are consecutively interlinked by a coupling section that at least partially is of a similar type as the coupling section 32 such as is shown in FIG. 1.

At the places where the series of members 802, 804, 806, 808 that extend tangentially cross the series of members 812 that extend radially, an compound coupling section 814 is present that provides both a connection in tangential direction and in radial direction according to the invention. At the coupling locations where the series of members 802, 804, 806 and 810 that extend tangentially and the series of members 812 that extend radially do not cross each other, a simple coupling section 816 (see FIG. 1 and FIG. 7) is present.

The simple coupling sections in the series of members 802, 804, 806 and 808 that extend tangentially or the simple coupling sections in the series of members 812 that extend radially can also be replaced by free articulated couplings and/or by articulated couplings that want to fold in or out under the influence of a spring preload in a predetermined direction. Furthermore, it is possible to only replace the simple coupling sections and the parts of the compound coupling sections that interlink the members in each of the series of members 802, 804, 806 and 808 that extend tangentially by free articulated couplings and/or by articulated couplings that want to fold in or out under the influence of a spring preload in a predetermined direction, wherein the members of the series of members 812 that extend radially are interlinked by the previously described simple coupling sections and corresponding parts of the compound coupling sections. On the other hand, it is possible to only replace the simple coupling sections and the parts of the compound coupling sections that interlink the members in each of the series of members 812 that extend radially by free articulated couplings and/or by articulated couplings that want to fold in or out under the influence of a spring preload in a predetermined direction, wherein the members of the series of members 802, 804, 806 and 808 that extend tangentially are interlinked by the previously described simple coupling sections and corresponding parts of the compound coupling sections.

Figure 11B:
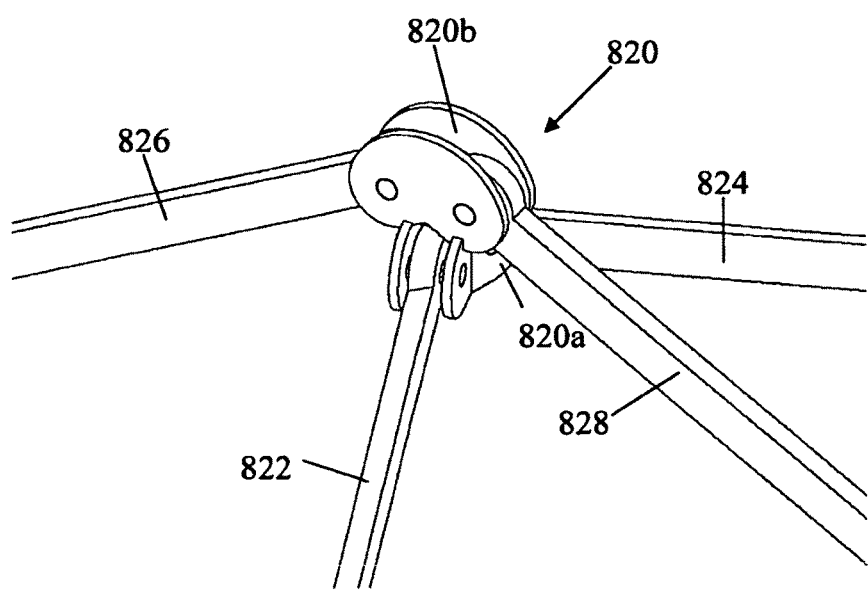
Figure 11C:
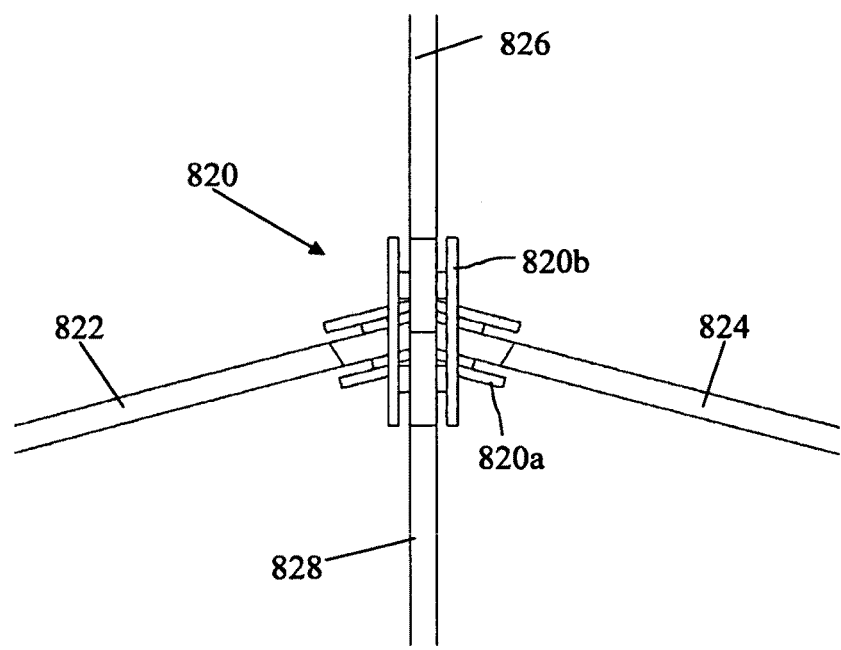
FIG. 11c shows as a plan view the assembled coupling element according to FIG. 11b.

FIGS. 11b and 11c illustrate an compound coupling section 820 that is not shown in detail. A member 822 that is only schematically shown is connected through a first section 820a of the compound coupling section 820 to a member 824 only schematically shown. The members 822 and 824 are part of a series of members that extend tangentially and the first section 820a of the compound coupling section 820 that is situated in-between is, for example, embodied as is illustrated in FIG. 7 wherein suitable drive means may also be provided (not shown, see for example, FIG. 2). A member 826 only schematically shown is linked through a second section 820b of the compound coupling section 820 to a member 828 only schematically shown. The members 826 and 828 are a part of a series of members that extend radially and the second section 820b of the compound coupling section 820 that is situated in-between is, for example, embodied as is illustrated in FIG. 1, wherein suitable drive means may also be provided (not shown, see for example FIG. 2).

The articulated device 800 can, for example, support a thin flexible material having a large area, for example where the compound coupling sections are or where the simple coupling sections are, or more in general at predetermined hingeable couplings of the articulated device 800, or at predetermined members of the articulated device 800. The flexible material can, when the members are in the folded-in condition, cover a considerable area (for example, tens, hundreds or thousands of square meters) of the aforementioned material, either as a flat area or as a curved area, while the articulated device 800, in folded-in condition, takes up a very limited volume, wherein the aforementioned material can also be folded in. In general, the articulated device 800 can, therefore, in the folded-out condition, provide a collection of support places that are on a hypothetical surface area that can be either flat or curved (singly curved or multiply curved) to support a material or a structure similar to the ring-shaped constructions according to the FIGS. 8a-8c, 9a-9c, 10a and 10b. An example of an application is a sunlight concentrator on a spacecraft wherein the aforementioned material can have been provided with a light-reflecting coating.

Figure 12A:
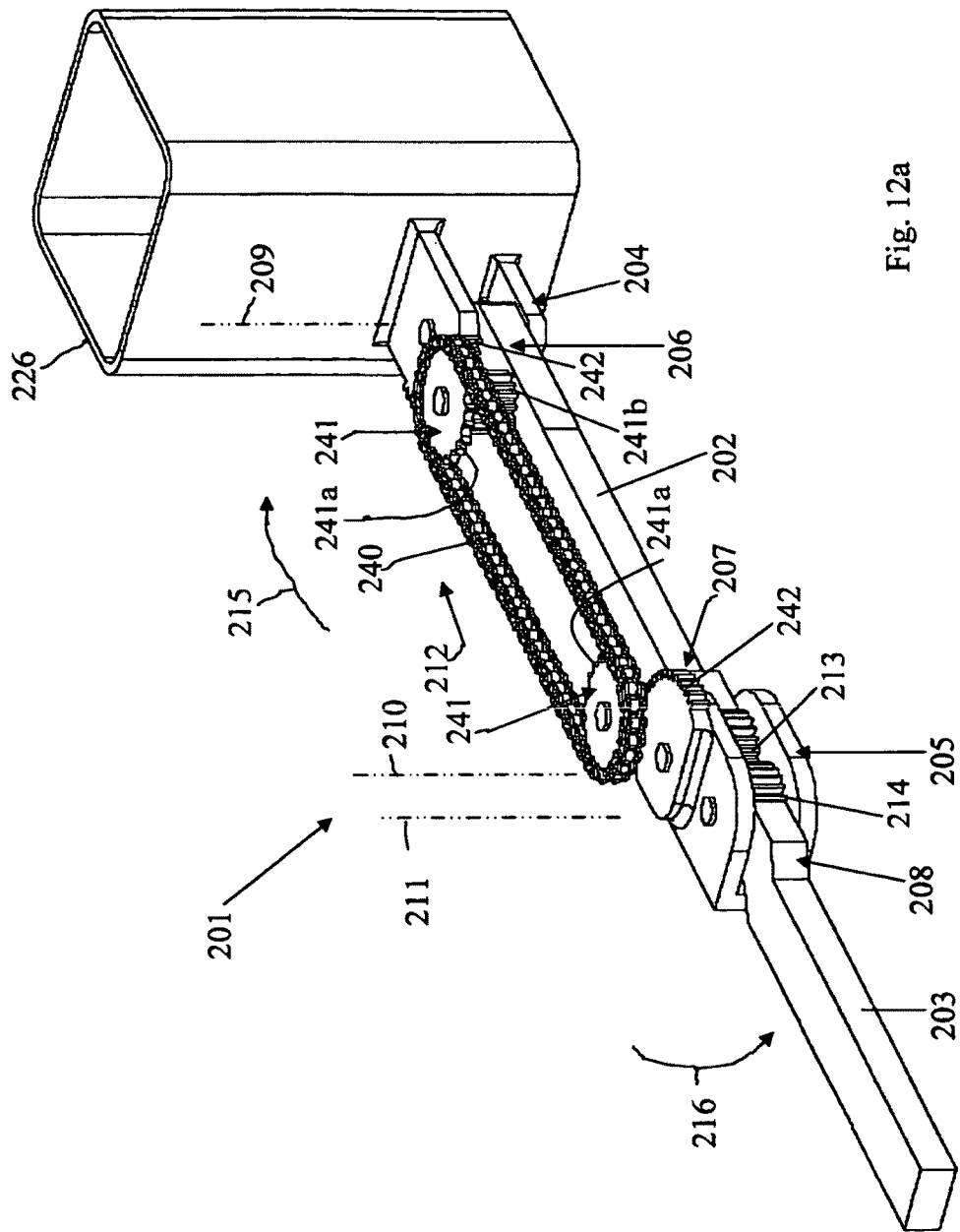
FIG. 12a is a perspective view of a further embodiment of an articulated device according to the invention having two members, in an end position ('folded-out' condition)

FIG. 12a shows an articulated device 201 having a first arm 202 and a second arm 203, and a first coupling section 204 and a second coupling section 205. The first arm 202 is, at a first end 206 thereof, connected to the first coupling section 204 hingeably around a hinge axis 209. The first arm 202 is, at a second end 207 thereof, connected to the second coupling section 205, hingeably around a hinge axis 210. The second arm 203 is hingeably connected to the second coupling section 205 at a first end 208 thereof around a hinge axis 211.

A first coupling 212 couples the first coupling section 204 to the second coupling section 205, wherein a rotation of the first arm 202 relative to the first coupling section 204 causes a predetermined rotation of the second coupling section 205 relative to the first arm 202.

The first coupling 212 comprises in the shown embodiment a chain 240, two double gears 241 and two gear sectors 242. In the shown embodiment, the gear sectors 242 are separate components that are fixed to the first coupling section 204 and the second coupling section 205, respectively, but can also form a unit as an alternative (for example, in the way of the sets of teeth 40 and 42 of the coupling section 32 in FIG. 1). The double gears 241 are supported in a rotational way on the first arm 202, wherein a set of teeth 241a of the double gear 241 engages with the chain 240, and a set of teeth 241b of the double gear 241 engages with a gear sector 242. The sets of teeth 241a and 241b are fixedly connected to each other.

The first arm 202 is provided with a set of teeth 213 at the second end 207 thereof while the second arm 203 is provided with a set of teeth 214 at the first end 208 thereof. The sets of teeth 213 and 214 engage with each other in the second coupling section 205 and, thus, the second end 207 of the first arm 202 is hingeably connected to the first end 208 of the second arm 203.

The first coupling section 204 connects the arm construction 201 to a frame 226. The second coupling section 205 connects the first arm 202 to the second arm 203 wherein each arm 202, 203 has its own hinge axis 210 and 211, respectively. In the embodiment shown in FIG. 12a the second arm 203 forms a last arm and, as a consequence, this arm only has an articulated connection with the first end 208 thereof and no articulated connection at an end opposite the first end 208.

The hinge axes 209, 210 and 211 have the same orientation in the embodiment shown in FIG. 12a but can also have different directions (when the articulated connections are correspondingly adjusted).

The operation of the embodiment shown in FIG. 12a is as follows.

Figure 12B:
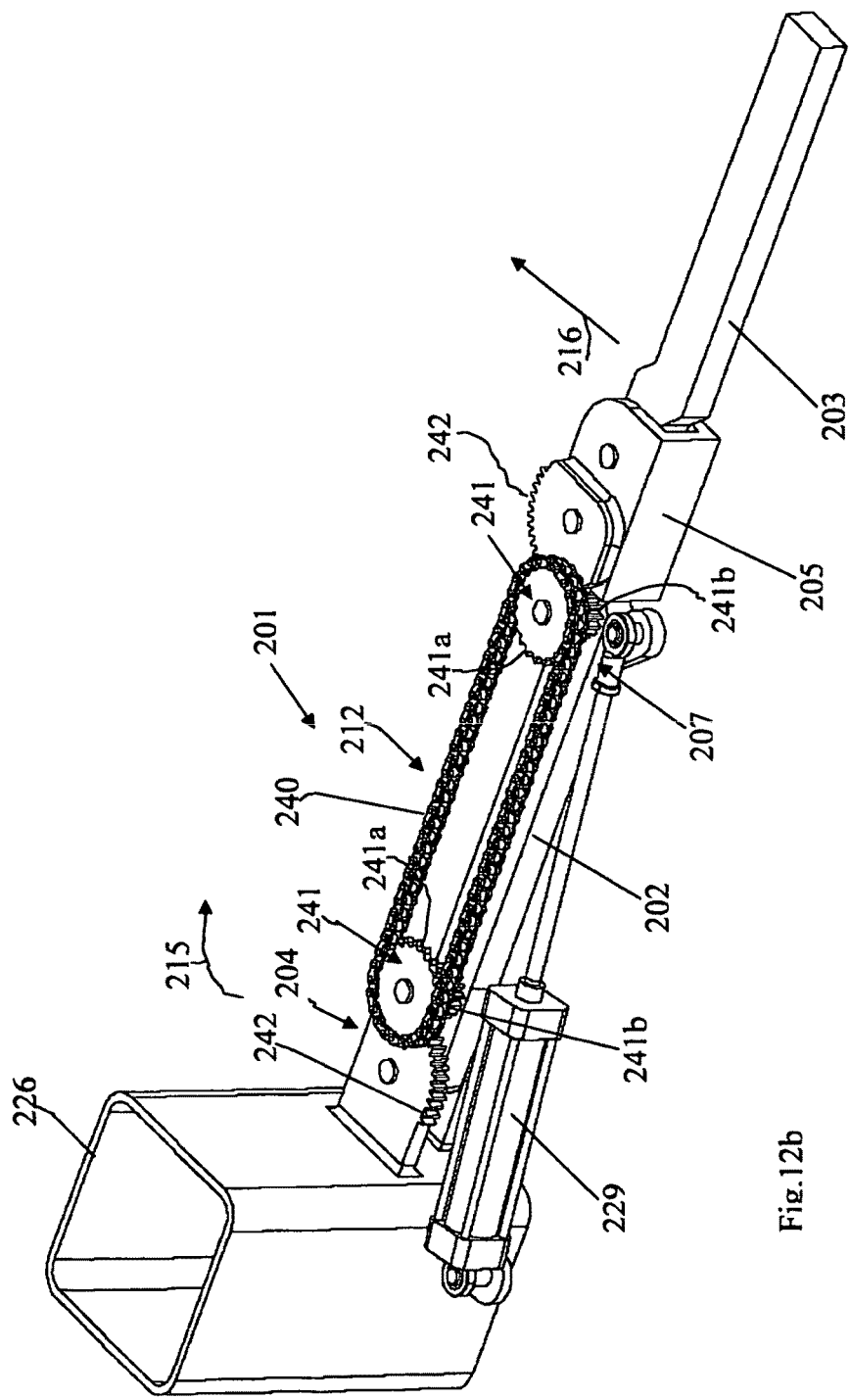
FIG. 12b shows the device according to FIG. 12a from another perspective, and where an actuator has been added.

When the first arm 202 rotates relative to the first coupling section 204 around the hinge axis 209 (which rotation can, for example, be brought about by a cylinder/piston device 229 which is hingeably coupled to, on the one hand, the frame 226 and, on the other hand, to the second end 207 of the first arm 202, as shown in FIG. 12b) in the direction of arrow 215, the double gear 241 situated at the first end 206 of the first arm 202 will be made to rotate by the gear sector 242 that is mounted on the first coupling section 204. Thereby the chain 240 will start to move relative to the first arm 202, wherein the chain 240 will make the double gear 241 rotate near the second end 207 of the first arm 202. The double gear 241 will, in turn, make the gear sector 242 rotate that is fixed to the second coupling section 205. Since this gear sector 242 is fixed to the second coupling section 205, the second coupling section 205 will also be made to rotate. Such a rotation also causes a rotation of the second arm 203 relative to the second coupling section 205 in the direction of arrow 216. When the rotation continues, the first arm 202 and the second arm 203 finally arrive in the positions shown in FIG. 12c. Thus, the positions of the first arm 202 and the second arm 203 can be varied between a position in line with each other (a folded-out condition according to FIG. 12a) and a position parallel and next to each other (a folded-in condition according to FIG. 12c). It should be noted here that the orientation of the coupling section 205 (wherein the orientation, for example, is measured as a line that connects the hinge axes 210, 211 and is perpendicular thereto) substantially does not change between the folded-out condition and the folded-in condition.

A positioning device can, therefore, be recognised in the assembly of the double gear 241, in particular the set of teeth 241b thereof, and the gear sector 242 interacting therewith. By driving the double gear 241 at the set of teeth 241a thereof with the chain 240, an angular position of the first arm 202 and the second arm 203 relative to the second coupling section 205 is set.

Figure 12C:
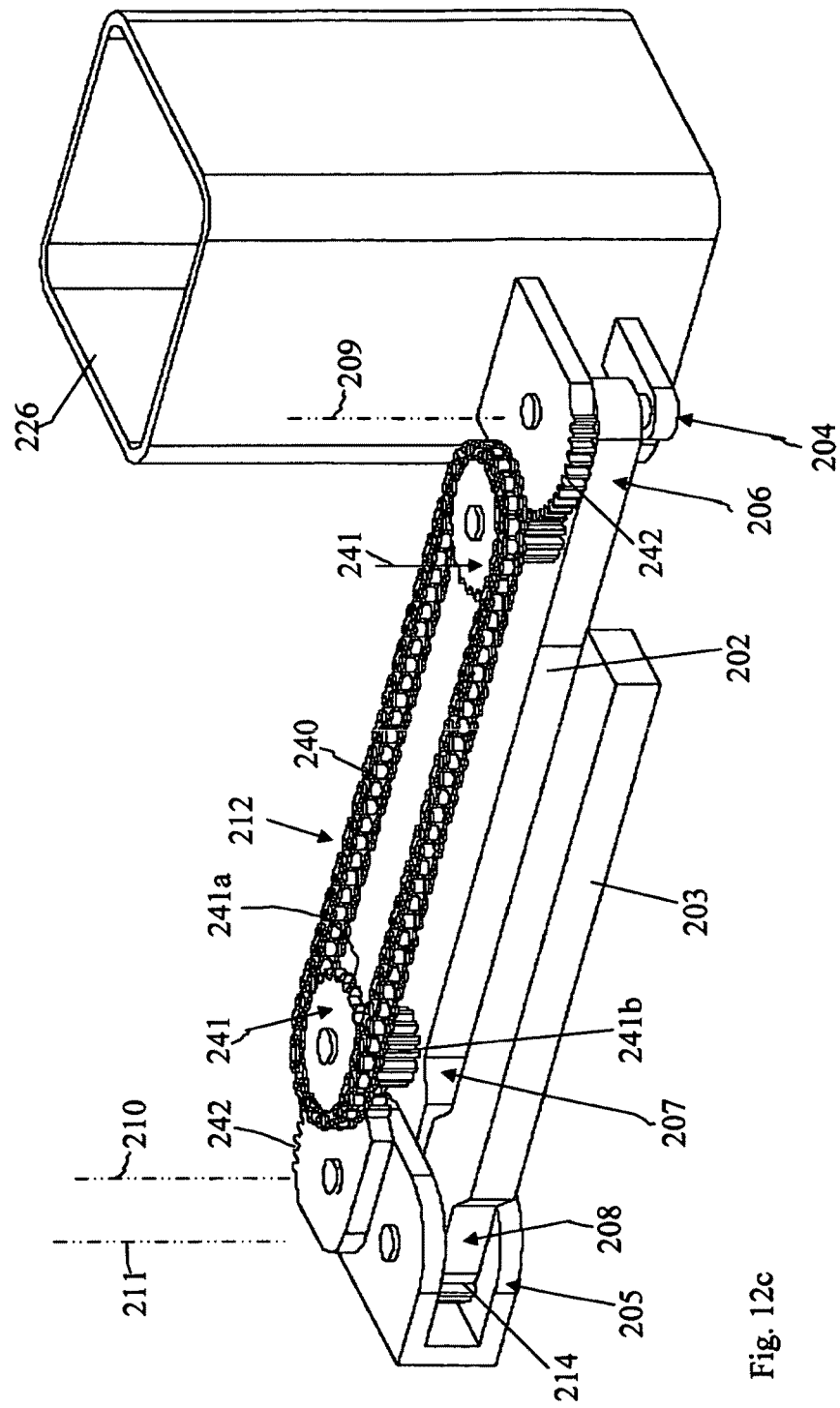
FIG. 12c shows the device according to FIG. 12a in another end position ('folded-in' condition)
Figure 13:
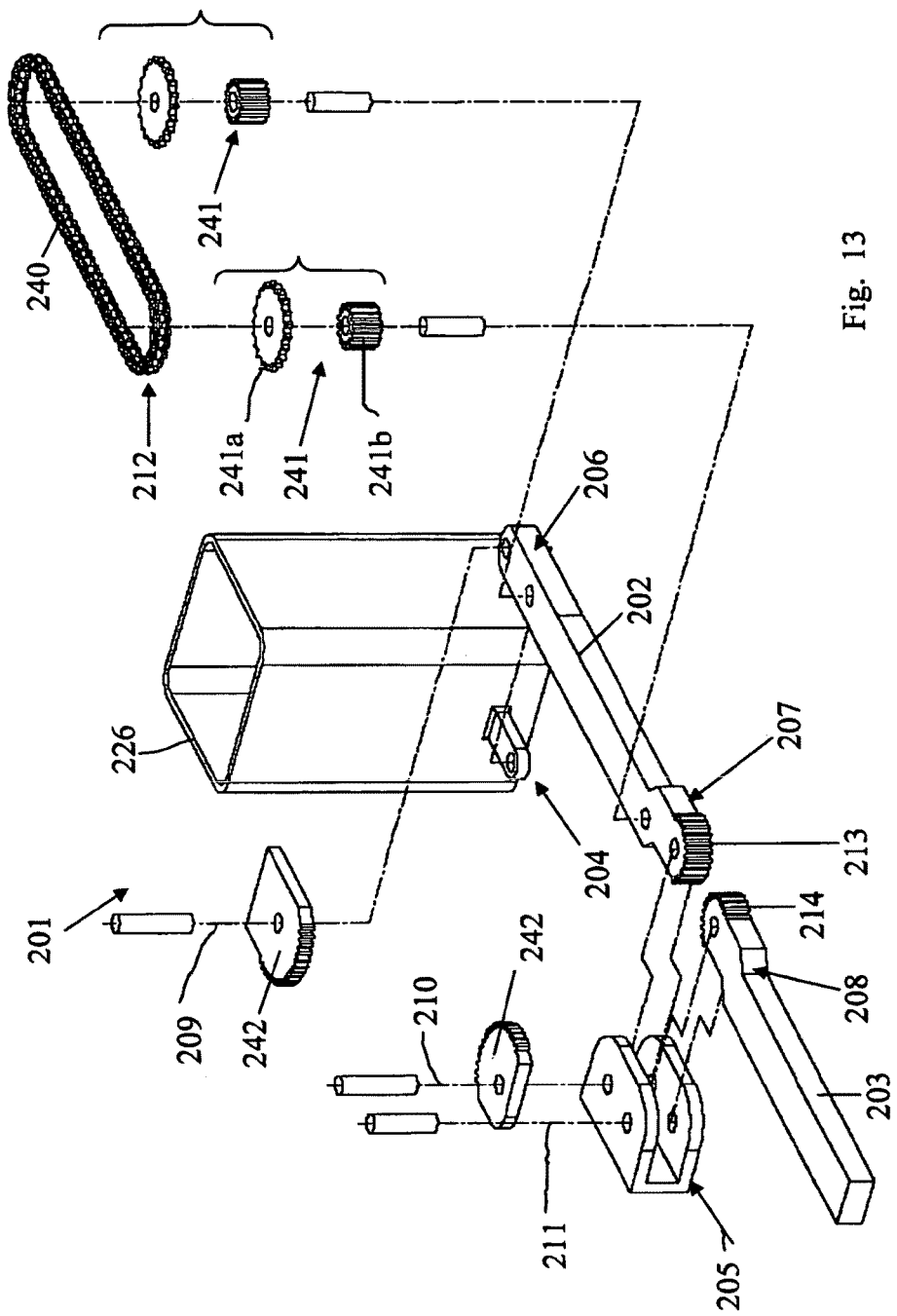
FIG. 13 is a perspective view of the device according to FIG. 12a in a disassembled condition.

FIG. 13 shows the embodiment of FIGS. 12a and 12c in a disassembled form wherein corresponding components have corresponding reference numbers.

In the embodiment shown in FIGS. 12a, 12c and 13, the transmission ratios in the first coupling 12 have been selected in such a way that when the first arm 202 is rotated relative to the first coupling section 204, the second coupling section 205 covers an equal rotation in the opposite direction relative to the first arm 202. Naturally, other transmission ratios are also possible, wherein the aforementioned different rotations are different.

Figure 14:
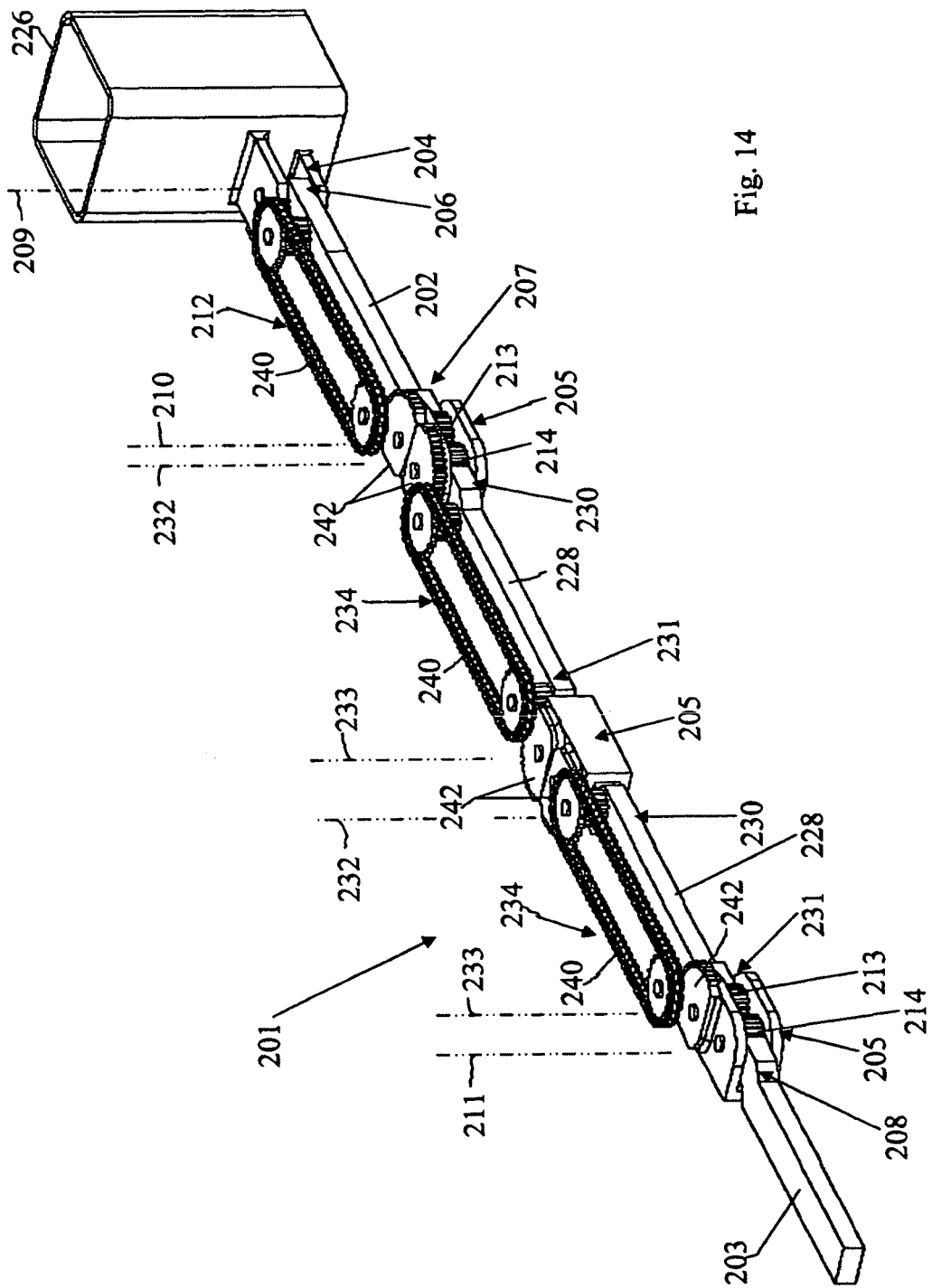
FIG. 14 is perspective view of a further embodiment of the articulated device according to the invention having four members, in a 'folded-out' condition.

FIG. 14 shows an embodiment of an articulated device in which, in contrast to FIGS. 12a, 12c and 13, more than two arms have been provided. In FIG. 14, one first arm 202, one second arm 203 and two third arms 228 are provided. The third arms 228 are situated between the first arm 202 on the side of the frame 226 and the second arm 203, and have opposite ends 230 and 231. Going from the frame 226 along the arms, first coupling section 204 (having hinge axis 209), first arm 202, second coupling section 205 (with hinge axes 210, 232 and provided with two gear segments 242), third arm 228, second coupling section 205 (having hinge axes 233, 232 and provided with two gear segments 242), third arm 228, second coupling section 205 (having hinge axes 233, 211 and provided with one gear segment 242) and second arm 203 are consecutively provided in the articulated device. The second coupling sections 205 are interlinked through couplings 234.

In FIG. 14, the arms 202, 203 and 228 are drawn as being and moving in substantially a single plane. An person skilled in the art will, however, realise that when the hinge axes 209, 210, 211, 232 and 233 are not parallel and the different sets of teeth in the arm construction 1 have been correspondingly adjusted, the arm construction 1 can make a complex movement wherein the arms no longer have to move in a single plane.

As shown in FIG. 14, the coupling sections 205 are oriented in a rotated manner relative to each other over 180 degrees to allow a movement of the members of the articulated device 201 in a concertina way.

Figure 15:
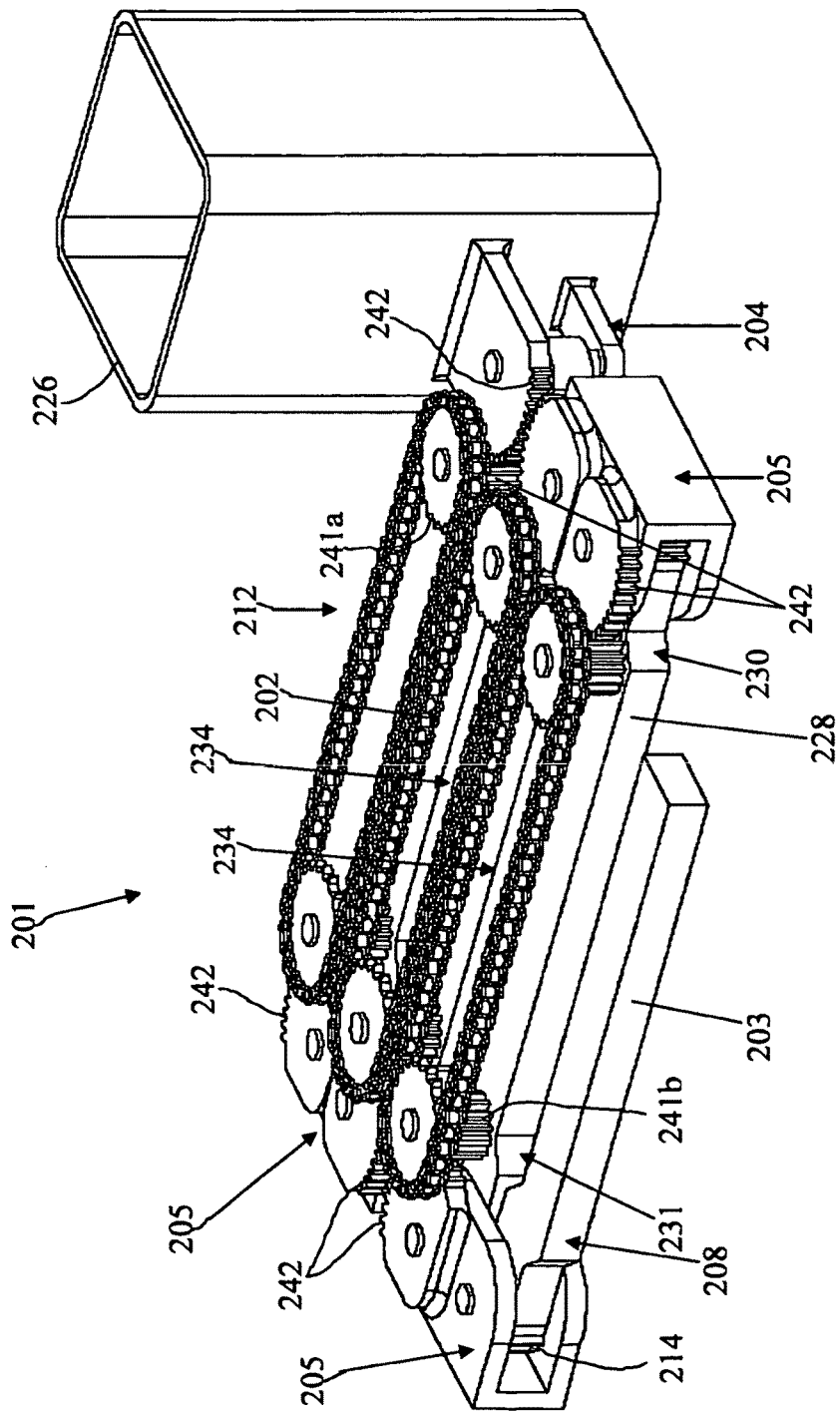
FIG. 15 shows the device according to FIG. 14 at an enlarged scale, in a 'folded-in' condition.

FIG. 15 shows the same embodiment as FIG. 14, wherein in FIG. 15 the arms 202, 203 and 228 are next to each other (folded-in condition) in contrast to the situation in FIG. 14, in which the arms 202, 203 and 228 are in each other's extension (folded-out condition).

Figure 16:
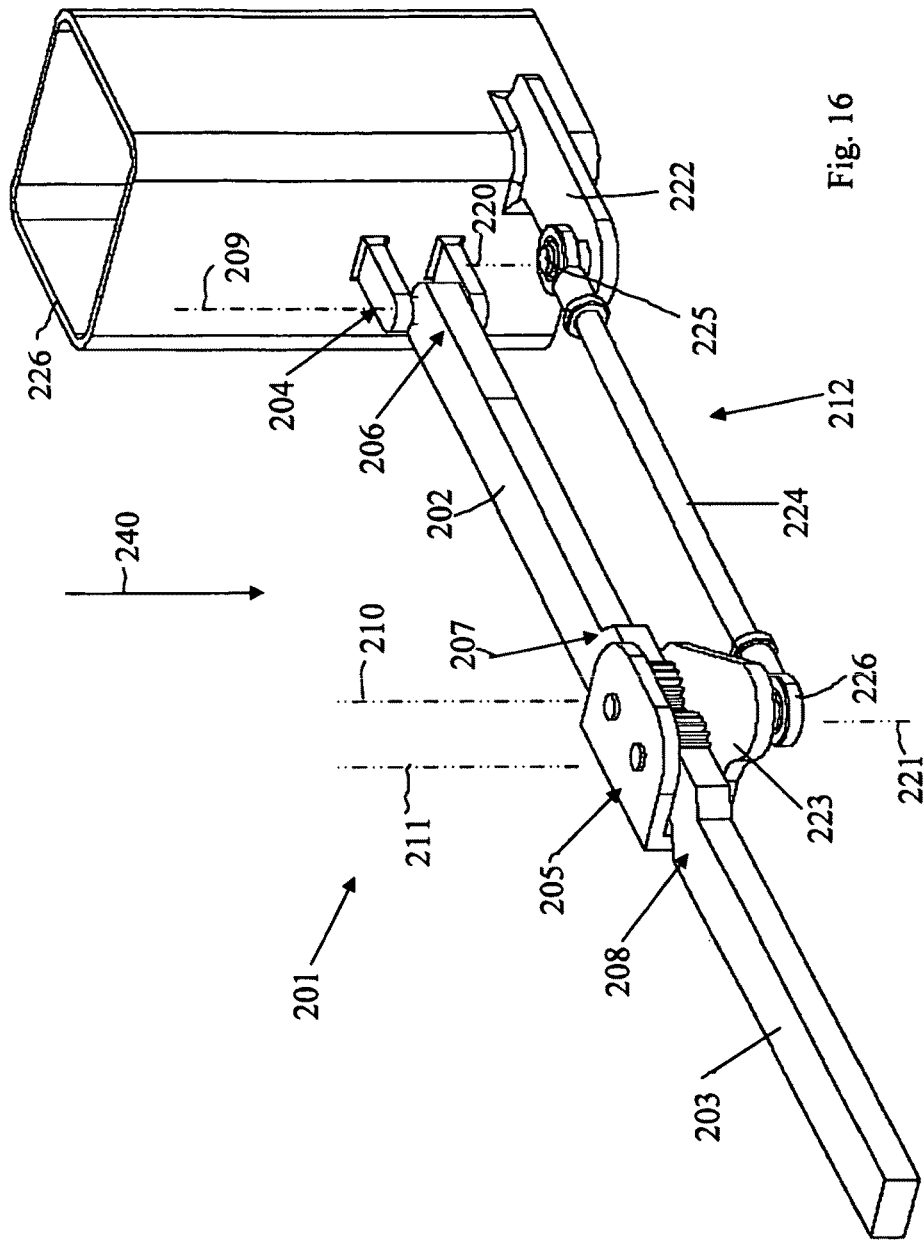
FIG. 16 is a perspective view of a further embodiment of the articulated device according to the invention having two members, in a 'folded-out' condition.

FIG. 16 shows an embodiment of an articulated device 201, wherein the coupling 212 is made in the form of a drive rod 224, which is hingeably connected to a first support 222 provided on the frame 226 and a second support 223 installed on the second coupling section 205, through hinges 225 and 226, respectively, on the ends thereof. Viewed from the direction that is indicated by arrow 240, the hinge 225 has been placed at a distance from the hinge axis 209 and at a distance from the first arm 202. Viewed from the same direction 240, the hinge 226 has been placed at a distance from the hinge axes 210, 211, and at a distance from the first arm 202, at the same side of the first arm 202 as the hinge 225. The hinges 225, 226 have hinge axes 220 and 221, respectively. The distance from the hinge 225 or the hinge axis 220 to the frame 226 is larger than the distance from the hinge axis 209 to the frame 226 and, in the folded-out condition of the articulated device 201 shown in FIG. 16, the distance from the hinge 226 or the hinge axis 221 to the frame 226 is larger than the distance from the hinge axes 210, 211 to the frame 226.

Figure 17:
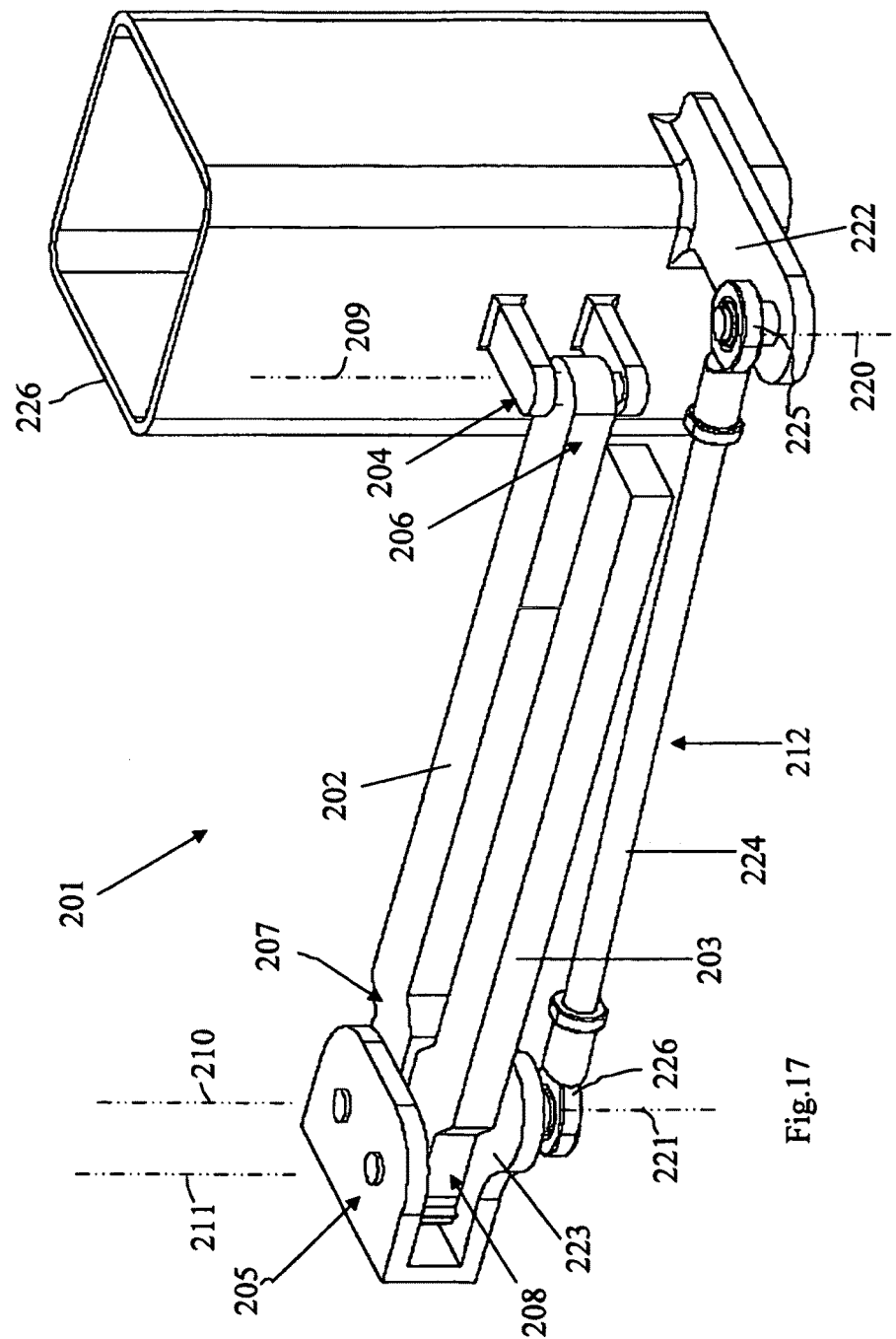
FIG. 17 shows the device according to FIG. 16 at an enlarged scale, in a 'folded-in' condition.

FIG. 17 shows the embodiment of FIG. 16 in folded-in condition wherein the first arm 202 is substantially parallel to the second arm 203 and situated next thereto. In order to bring about the transition of the condition of the articulated device 2001 shown in FIG. 16 to the condition of the articulated device 201 shown in FIG. 17, or back, any suitable actuator can be used that, for example, engages on the first arm 202 or between the first arm 202 and the frame 226 to make the first arm 202 rotate between the two positions.

Figure 18:
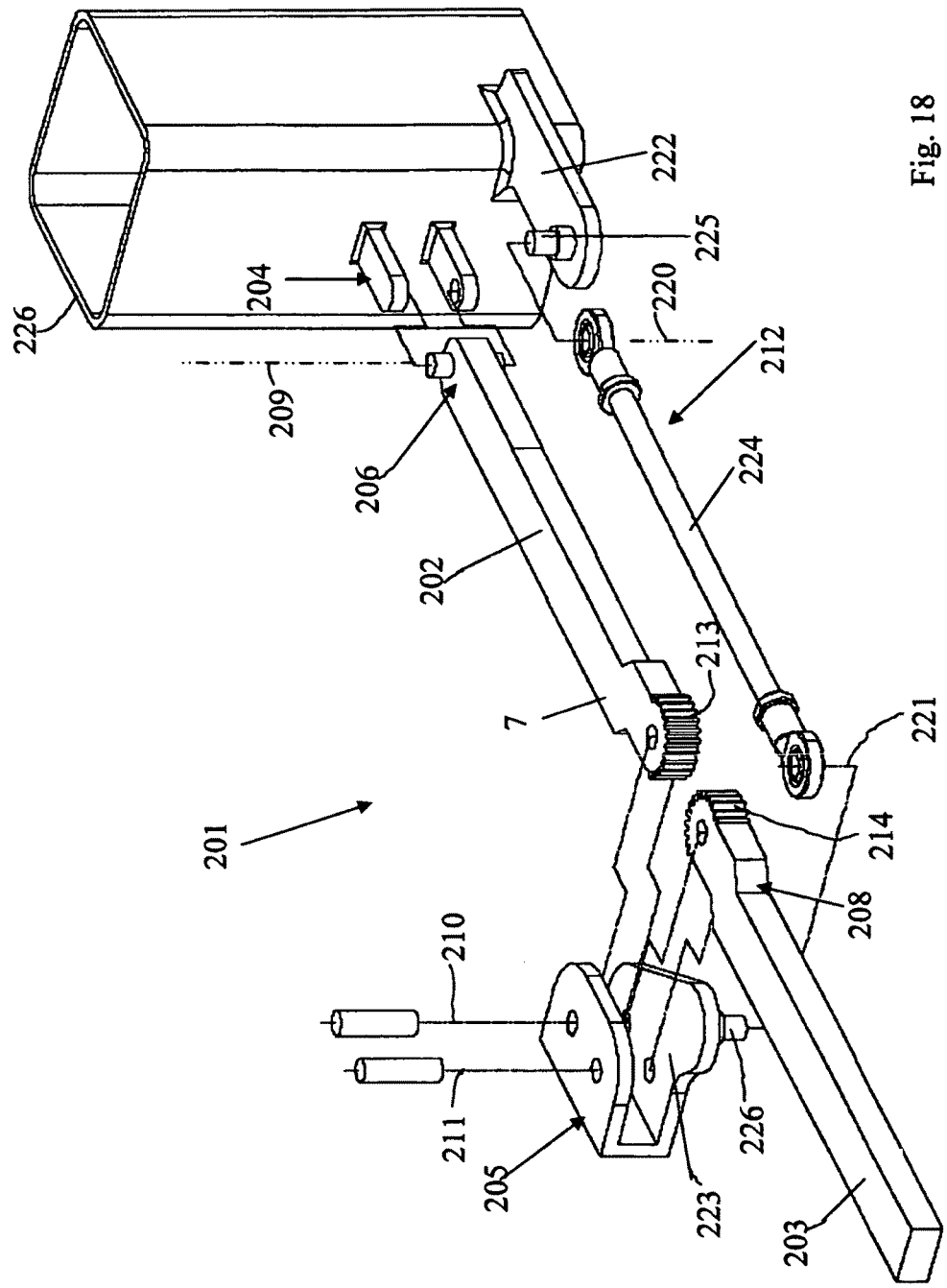
FIG. 18 is a perspective view of the device according to FIG. 16 in a disassembled condition.

FIG. 18 shows the embodiment of FIGS. 16 and 17 in a disassembled form. It can be clearly seen that the drive rod 224 is a hinged rod that fixes the distance between the hinges 225 and 226 on the first and second supports 222 and 223, respectively, at a predetermined length. This means that the rotation of the second coupling section 205 relative to the first arm 202 is determined at a rotation of the first arm 202 relative to the first coupling section 204.

A positioning device can be identified in the combination of the support 223 and the drive rod 224 wherein the angular position of the first arm 202 and the second arm 203 can be set relative to the second coupling section 205 by the positioning device.

Figure 19:
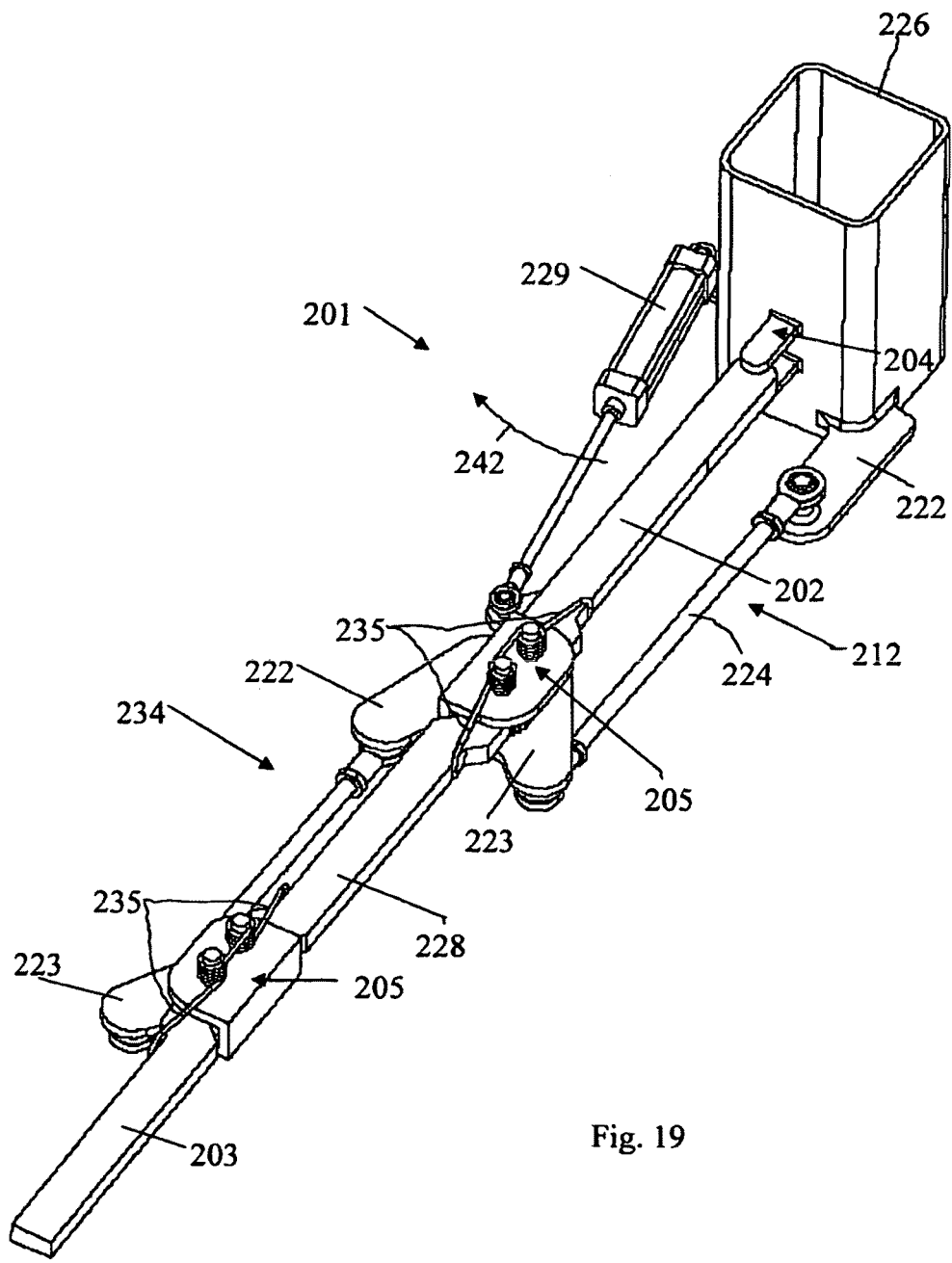
FIG. 19 is a perspective view of a further embodiment of the articulated device according to the invention having three members.

FIG. 19 shows an articulated device 201 having a first arm 202, a second arm 203 and an intermediate third arm 228. The first arm 202 is connected to the third arm 228 through a coupling section 205 and the third arm 228 is, in turn, connected to the second arm 203 through another coupling section 205.

The coupling section 205 between the first arm 202 and the third arm 228 is provided with two supports 222,223, wherein support 223 is hingeably connected to an end of a drive rod 224 of which an opposite end is hingeably connected to a support 222 installed on the frame 226. The coupling section 205 between the third arm 228 and the second arm 203 is provided with one support 223 that is hingeably connected to an end of a drive rod 224 of which an opposite end is hingeably connected to a support 222 provided on the other coupling section 205.

The coupling sections 205 are provided with spring constructions 235 to compensate for forces that can occur in the articulated device 201. The spring constructions 235 exert such a force that operates between the coupling sections 205 and the first, second and third arms 202, 203, 228 connected thereto that the arms have a tendency to direct themselves in each other's extension when there is no other orientating or blocking forces. It should, by the way, be noted that other constructions than spring constructions can also be used for this application.

The first arm 202 can be rotated in the direction of arrow 242, through an actuator which in FIG. 19 is shown by way of example in the form of a cylinder/piston unit 229, but can also have any other embodiment wherein a force can be exerted between the frame 226 and the first arm 202, or at least a force can be exerted on the first arm 202. A movement in the opposite direction can take place by the operation of the spring constructions 235 or also (if the spring constructions have insufficient spring force) by using the cylinder/piston unit 229 or another actuator.

When the first arm 202 rotates, the coupling section 205 that is provided with the supports 222 and 223 will also move, wherein the orientation of this coupling section 205 will mainly stay the same as a consequence of the articulated connection between this coupling section 205 and the frame 226 in the form of the drive rod 224. Said coupling section 205 will rotate due to this relative to the first arm 202. The third arm 228 will also turn relative to the coupling section 205 in an opposite direction as a consequence of the mutually engaged sets of teeth (also see FIGS. 1 and 11) at the ends of the first arm 202 and the third arm 228 that come together in the coupling section 205.

In a similar way, the next coupling section 205 relative to the third arm 228 will be rotated while retaining the orientation of said next coupling section 205, as a consequence of the turning of the third arm 228 relative to said coupling section 205 due to the operation of the next connecting rod 224 that is situated next to the third arm 228. As a consequence of the mutually engaged sets of teeth at the ends of the third arm 228 and the second arm 203 that come together in said next coupling section 205, the second arm 203 also turns in an opposite direction relative to this coupling section 205.

Thus, as is the case in the previous embodiments, the arms 202, 203, 228 of the folded-out condition shown in FIG. 19 (in which the arms are in each other's extension) can be transferred to a folded-in condition (in which the arms are next to each other) and vice versa.

Figure 20:
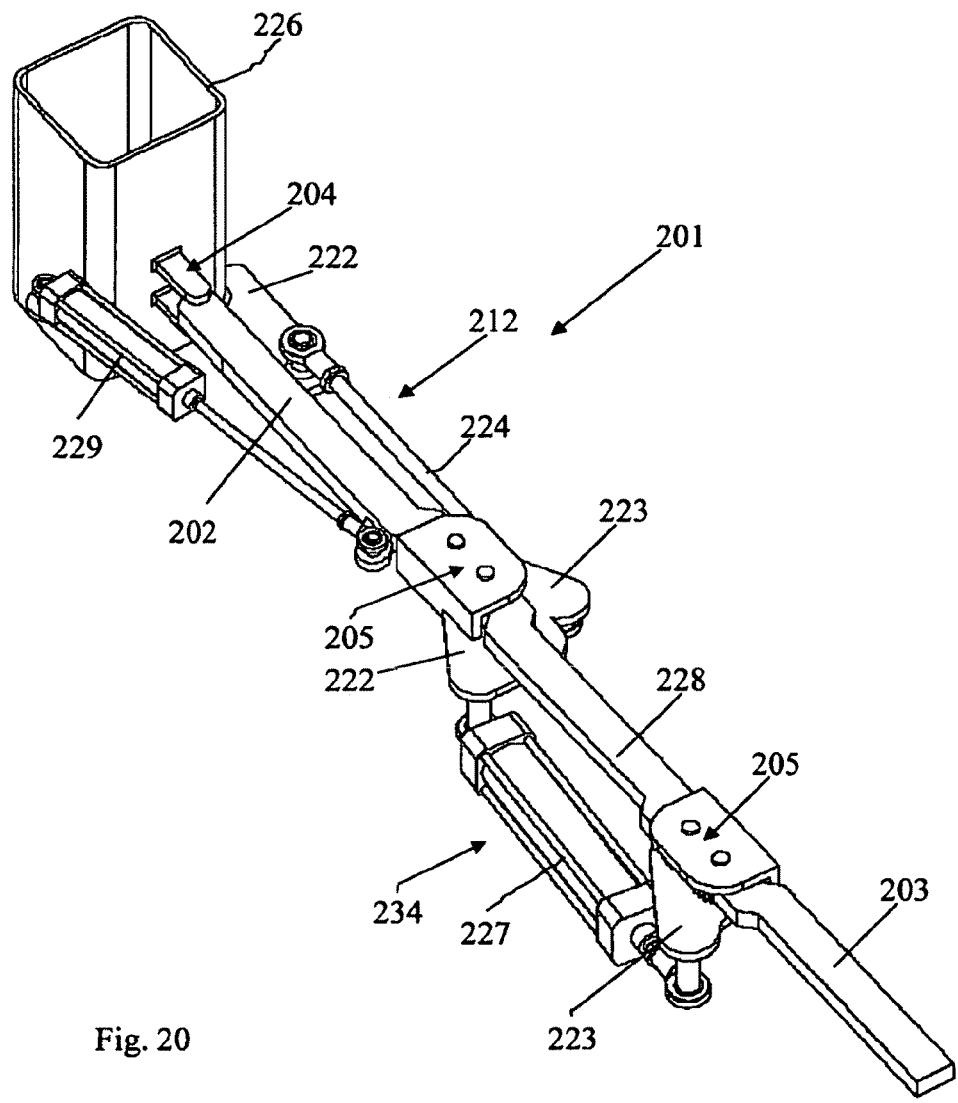
FIG. 20 is a perspective view of a further embodiment of the articulated device according to the invention having three members.
Figure 21:
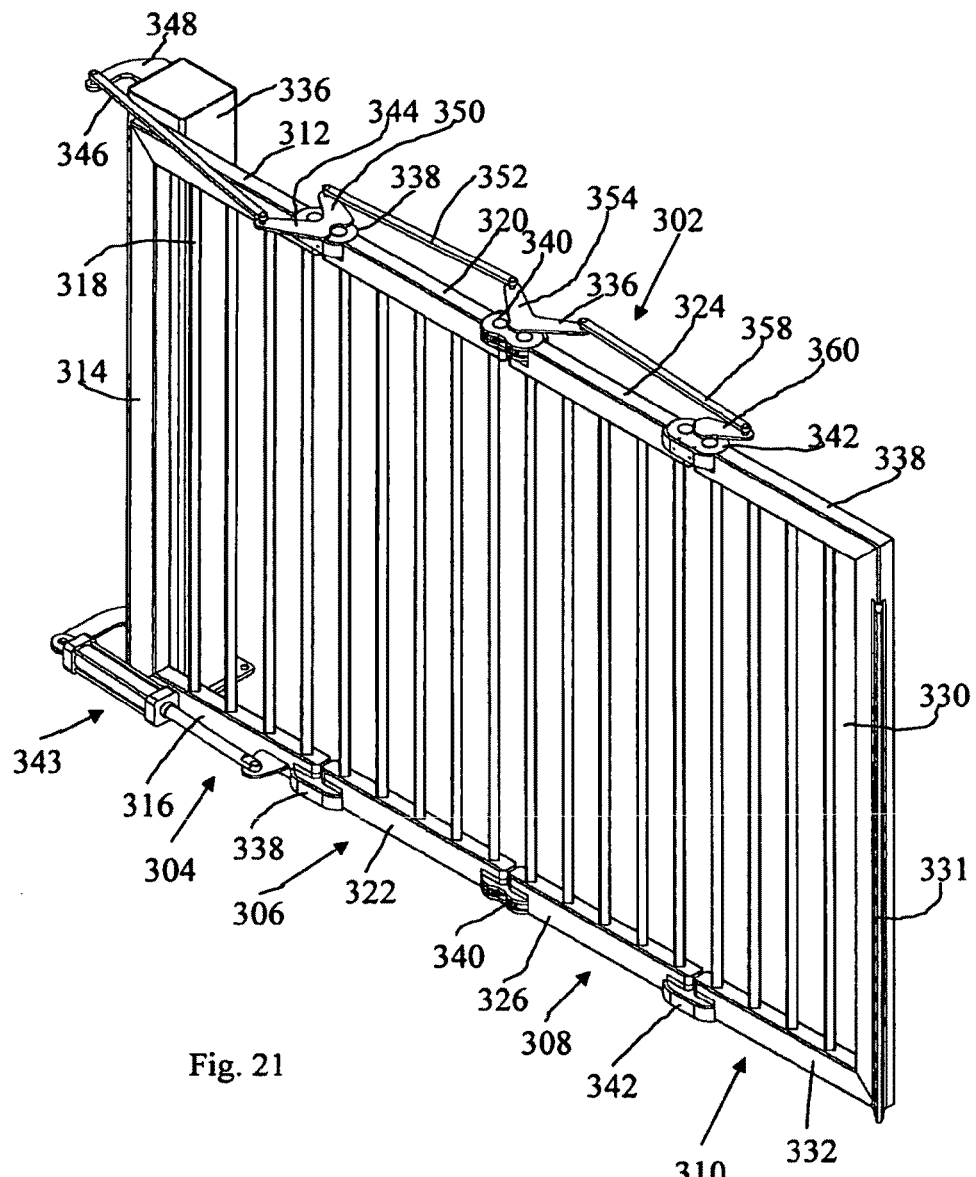
FIG. 21 is a perspective view of a further embodiment of the articulated device according to the invention having four members, in a 'folded-out' condition.
Figure 22:
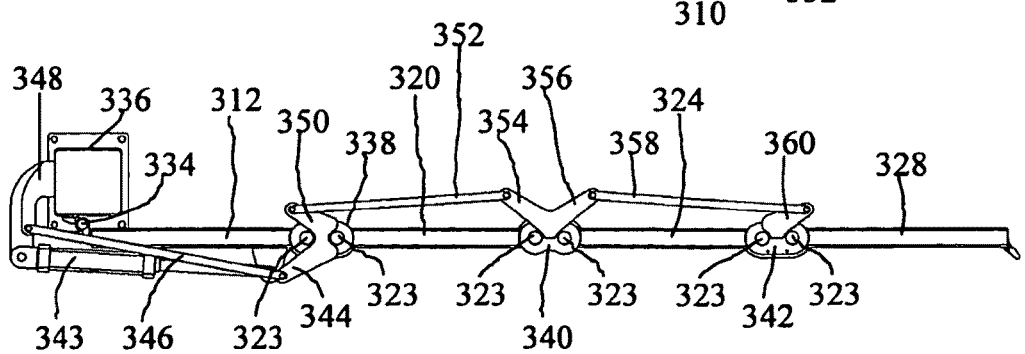
FIG. 22 is a plan view of the device according to FIG. 21.
Figure 23:
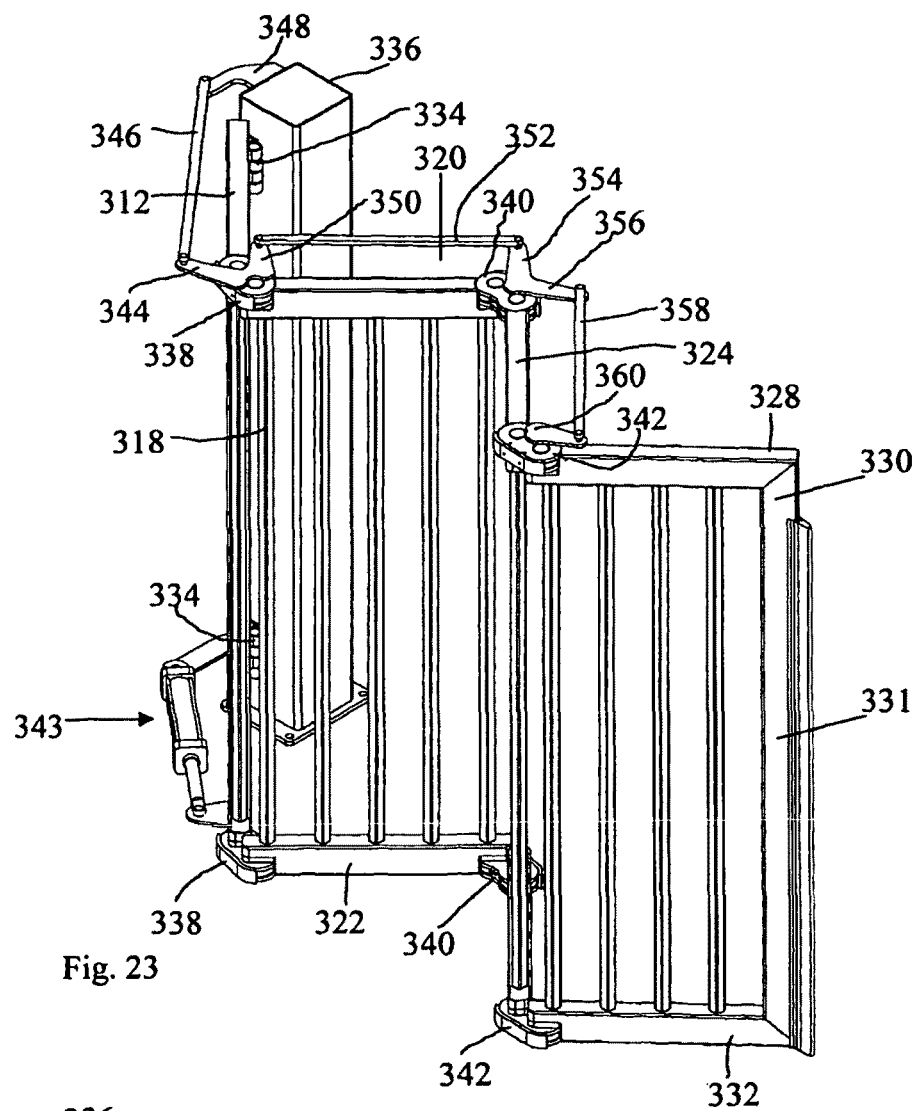
FIG. 23 is a perspective view of the device according to FIG. 21 in an intermediate position.
Figure 24:
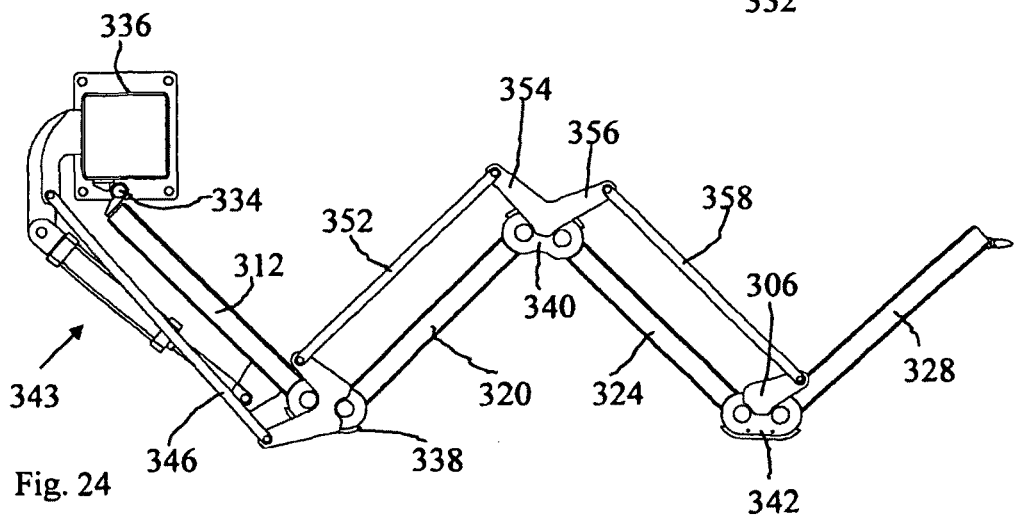
FIG. 24 is a plan view of the device according to FIG. 23.
Figure 25:
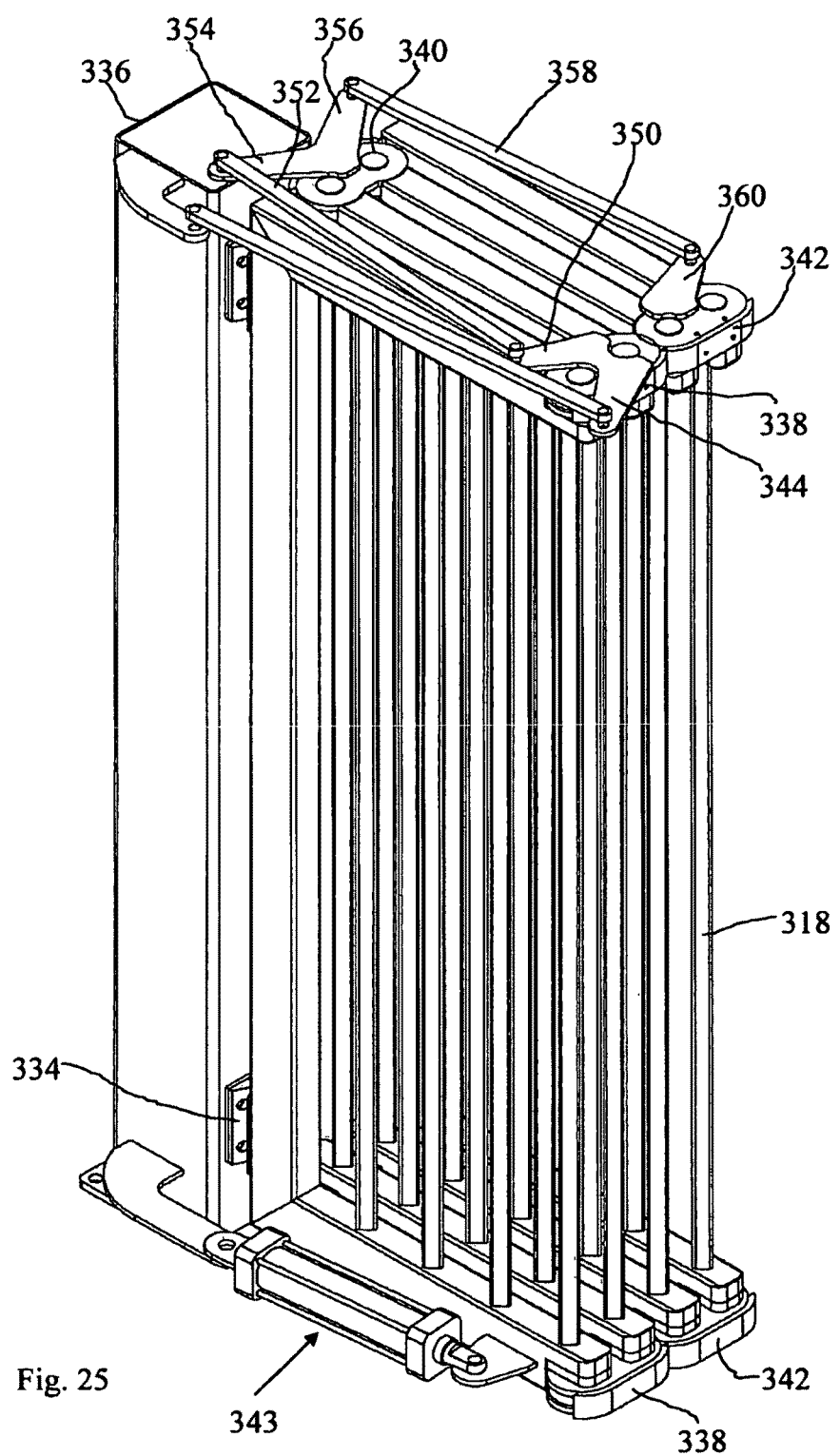
FIG. 25 is a perspective view of the device according to FIG. 21 in a 'folded-in' condition.
Figure 26:
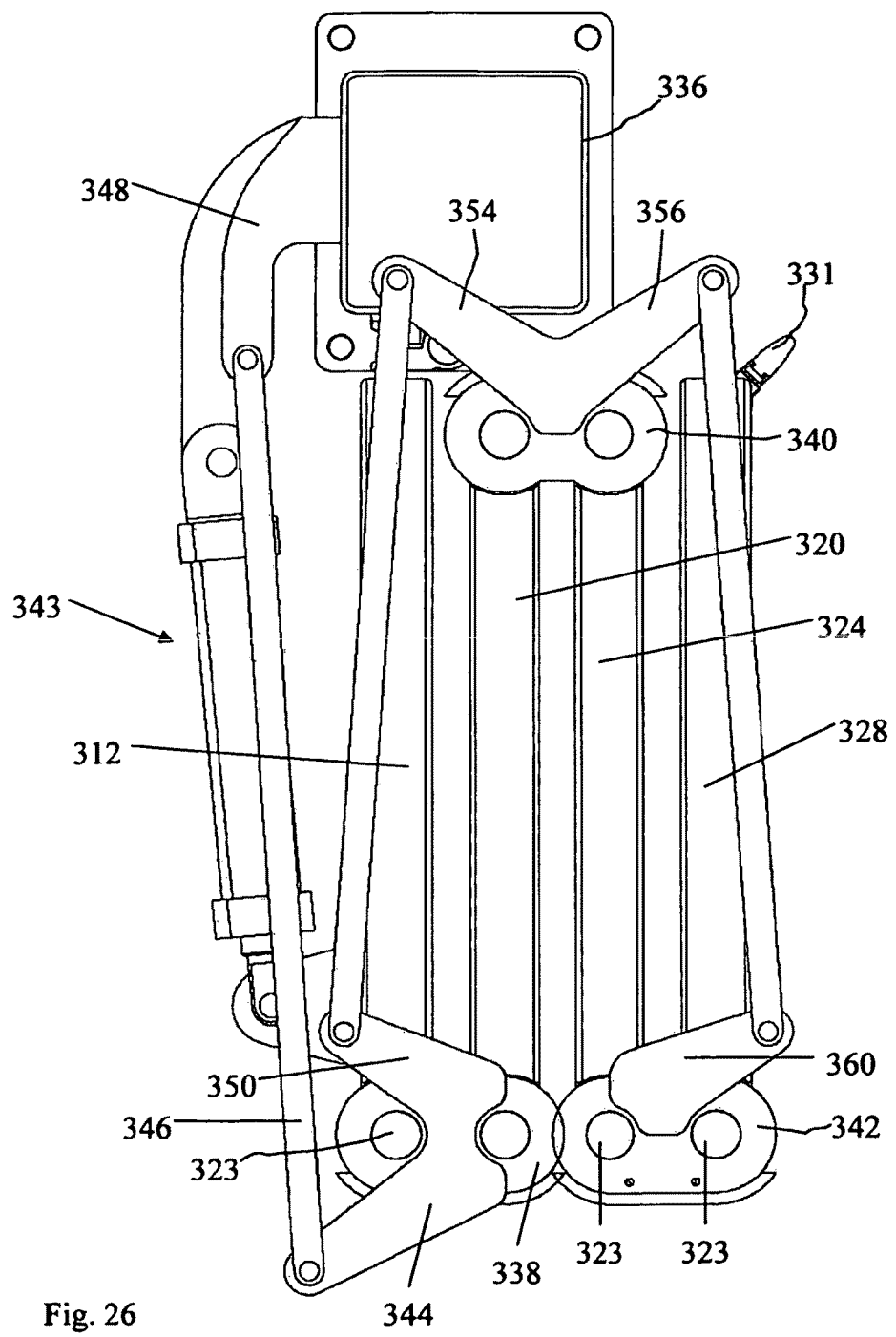
FIG. 26 is a plan view of the device according to FIG. 25.

In the embodiment shown in FIG. 20, the drive rod 224 that extends between the coupling sections 205 is replaced by a connection having an adjustable length when compared to the embodiment of FIG. 19. In FIG. 20, by way of example this connection is made as a cylinder/piston unit 227. By using the cylinder/piston unit, the ratio between the rotations of the coupling sections 205 relative to the third arm 228 can be set.

FIGS. 21-26 show an articulated device 302 having four members 304, 306, 308 and 310. The member 304 comprises bars 312, 314, 316, wherein the bars 312 and 316 are interlinked by four rods 318. The member 306 comprises bars 320, 322 that are interlinked by five rods 318. The member 308 comprises bars 324, 326 that are interlinked by five rods 318. The member 310 comprises bars 328, 330, 332 wherein the bars 328 and 332 are interlinked by four rods 318. The number of rods 318 of each of the members 304, 306, 308, 310 can also be higher or lower than four and five, respectively. The articulated device 302 may, for example, be applied as a (section of a) mobile fence that can provide access to, for example, a space or a site. The bar 330 can be provided with a possibly flexible impact strip 331 to prevent damage to the fence.

The member 304 is hingeably connected to a frame or vertical member 336 through at least an articulated connection 334. The member 304 is hingeably connected to the member 306 through couling section 338 provided between ends of the bars 312 and 320 that are directed towards each other and through ends of the bars 316 and 322 that are directed towards each other, in which sets of teeth installed on the ends of the bars 312 and 320, and 316 and 322, respectively, mutually engage in the way that previously has already been explained and shown as, for example, by reference to FIG. 1, 11 or 16. In a similar way, the members 306 and 308 are hingeably interlinked through coupling sections 340, and the members 308 and 310 are hingeably interlinked through coupling sections 342. In each of the coupling sections, the sets of teeth are made to articulate around hinge axes 323. The coupling sections 338, 340 and 342 allow that each of the members connected to one of the coupling sections can rotate over an angle of substantially ninety degrees relative to the coupling section concerned. Thus, the members 304, 306, 308, 310 can be brought into each other's extension (see FIGS. 21, 22) or be put next to each other in a similar way as in a concertina (see FIGS. 25, 26), for which a cylinder/piston unit 343 or another actuator is provided that engages between the member 304 and the vertical member 336. The coupling sections 338, 340 and 342 retain their orientation within this context, that is to say, the direction of a line that connects centre lines of the hinge axes 323 of a coupling section always remain the same.

One of the coupling sections 338 is provided with a first support 344 that is hingeably connected at an end thereof to an end of a bar 346 of which the opposite end is hingeably connected to a support 348 provided on the vertical member 336. The same coupling section 338 is also provided with a second support 350 that is hingeably connected at an end thereof to an end of a rod 352 of which the opposite end is hingeably connected to an end of a third support 354 provided on one of the coupling sections 340. The same coupling section 340 is also provided with a fourth support 356 that is hingeably connected on an end thereof to an end of a rod 358 of which the end across is hingeably connected to an end of a fifth support 360 that has been installed on one of the coupling sections 342.

The first support 344 extends from the coupling section 338 in such a way that the hinge point of the coupling section 338 with the rod 346 is outside the coupling section 338. The angle between a line that connects one of the hinge axes 323 of the coupling section 338 to the aforementioned hinge point, on the one hand, and a line that connects the hinge axes of the coupling section 338 to each other, on the other hand, is smaller than ninety degrees and is, more specifically, between thirty and sixty degrees. The place of the aforementioned hinge point is selected in such a way that there is no interference with other supports or with the rods connected thereto but, nevertheless, the required forces between the supports can still be transferred.

In FIGS. 19-26 a positioning device can be identified in the combination of a support and a drive rod connected thereto, wherein the angular position of a first member or arm and the second member or arm can be set relative to the coupling section that is situated in-between by the positioning device.

FIGS. 27a, 27b, 27c and 27d show a device 710 for generating energy obtained from solar radiation, with a rectangular support 701 on which articulated devices 711, 712, 713, 714 are provided at the four sides or edges thereof. The articulated devices 711 and 713 each comprise four members 711a, 711b, 711c, 711d, and 713a, 713b, 713c, 713d, respectively. The articulated devices 712 and 714 each comprise three members 712a, 712b, 712c, and 714a, 714b, 714c, respectively. In a folded-out condition (as shown in FIG. 27a), the members of each articulated device 711, 712, 713, 714 extend in each other's direction, and each articulated device 711, 712, 713, 714 extends at an angle of more than 90 degrees relative to a plane of the support 701. As illustrated by FIGS. 27b, 27c and 27d, the members 711a-711d of the articulated device 711, and the members 713a-713d of the articulated device 713 can be folded in in a zigzag fashion until they rest on the support 701. Next, the members 712a-712c of the articulated device 712, and the members 714a-714c of the articulated device 714 can be folded in in a zigzag fashion until they rest on the members 711d and 713d. As illustrated by FIG. 27d, a compact device 710 is obtained in the folded-in condition of the articulated devices 711-714.

The folding in or folding out of the articulated devices 711-714 of the device 710 is done with the aid of set of teeth, coupling sections, hinge axes and positioning devices not shown in detail in FIGS. 27a-27d, of which the operation has been explained above by reference to one or more of the FIGS. 1-26.

The members of each articulated device 711, 712, 713, 714 are each provided with a reflecting surface at the side which (in folded-out condition) faces an opposite articulated device. At the side facing the articulated devices 711-714, the support 701 is provided with a solar energy collecting device, such as a photovoltaic device which converts solar radiation into electrical energy, or a solar collector which converts solar radiation into heat energy which is absorbed by a fluid inside the solar collector. The device 710 may be mounted at an end of a post or mast, or another support device that is connected to a ground. In that context, the device 710 may have a fixed position wherein the solar energy collecting device is directed to a point in the path of the sun. The device 710 can also be connected to the end of the support device by means of a positioning device not shown in detail, wherein the support 701 can be moved relative to the support device to follow the path of the sun, so as to expose the solar energy collecting device as much as possible to solar radiation. The reflecting surfaces of the members of the articulated devices 711-714 reflect sunlight to the solar energy collecting device mounted on the support 701 to increase the production thereof. The articulated devices 711-714 with their reflecting surfaces thus operate as sunlight concentrators.

In case no collection of solar energy is desired, or when there is a lack of solar energy during the night, or in case of unfavourable weather conditions (for example, in case of a storm), the device 710 can be brought in a folded-in condition (FIG. 27d).

In an embodiment, the angle between the plane of the support 710 and one or more of the articulated devices 711-714 in a folded-out condition thereof can be adjusted by a positioning device not shown in detail, in order to be able to establish an optimum reflection of sunlight on the solar energy collecting device.

The support 701 may be designed with three, four or more sides, at each of which an articulated device with reflecting surfaces is provided. The number (at least two) of, and the shape of the members of each articulated device is variable.

In a metaphorical sense, the device 710 corresponds to a flower, wherein the articulated devices 711-714 may be compared to petals.

Generally, the number of teeth of each of the sets of teeth in the articulated device can be determined by the skilled person based on normal design considerations.

The number of teeth of the set of teeth of a first member or arm can be the same as the number of teeth of the set of teeth of a second member or arm that is connected through a coupling section to the first member or the first arm, but the number of teeth of the first and second members, or the first and second arms, can also be different. The transfer ratio of the sets of teeth can also equal one or may differ therefrom. The set of teeth may allow the articulation of a member or arm relative to a coupling section over an angle of 90 degrees, such as previously shown, but such a set of teeth can also be selected in such a way that an articulation of a member or arm relative to a coupling section over an angle of 180 degrees is possible. The articulation of a first member or arm relative to a coupling section can be over another angle than the articulation of a second member or arm connected to the coupling section.

In the case of the transmission between a set of teeth of a positioning element and a set of teeth of a coupling section, a suitable transmission ratio can be selected, wherein the number of teeth of the set of teeth of the positioning element and the number of teeth of the corresponding set of teeth of the coupling section can equal or not equal each other. Within this context, the positioning element may be provided with teeth along the whole circumference or a part thereof within this context.

The positioning element may also be executed as a worm gear wheel to obtain a self-braking transmission. In the latter case, the strip or spring construction between the members or arms of the articulated device is not required.

It should be understood that the described embodiments are only examples of the invention that may be embodied in different forms. Therefore, specific structural and functional details that have been made public herein are not to be considered as limiting but only as a basis for the claims and as a representative basis to provide a skilled person with sufficient information to work the invention. The terms and phrases that have been used herein are not meant to be limiting, but to provide an understandable description of the invention.

The term 'a' that has been used herein is defined as one or more than one. The term 'number of' that has been used herein is defined as two or more than two. The term 'another' that has been used herein is defined as at least a second or more. The term 'comprising' and/or 'having/with' that has been used herein does not exclude other components not mentioned (that is to say, the term is not meant as being limiting or closed).

What is claimed is:

1. Articulated device, comprising:
   a first member provided with a first set of teeth fixedly connected thereto;
   a second member provided with a second set of teeth fixedly connected thereto;
   a coupling section on which the first set of teeth is hingeably supported around a first hinge axis, and on which the second set of teeth is hingeably supported around a second hinge axis, wherein the first set of teeth engages with the second set of teeth;
   a positioning device for setting an angular position of the first and second members relative to the coupling section, wherein the positioning device is configured to exert a force on the coupling section relative to at least one of the first and second members for causing the coupling section to hinge around the hinge axis connecting the coupling section with the first or second member,
   the positioning device further comprising a positioning element provided hingeably around a third hinge axis on one of said first and second members, which positioning element is provided with a third set of teeth fixedly connected thereto;
   a fourth set of teeth fixedly connected to the coupling section, wherein the third set of teeth engages with the fourth set of teeth; and
   a drive device for driving the positioning element.

2. Device according to claim 1, wherein the drive device exerts a force on the positioning element engaging at a distance from the third hinge axis.

3. Device according to claim 2, wherein the drive device comprises a tensile element.

4. Device according to claim 2, wherein the drive device comprises a pushing element.

5. Device according to claim 1, wherein the drive device is configured for rotationally driving the positioning element.

6. Device according to claim 1, wherein the first hinge axis and the second hinge axis are directed at an angle greater than 0 degrees.

7. Device according to claim 1, comprising n (n>3) coupling sections, wherein the first hinge axis and the second hinge axis of each coupling section are directed at an angle of 360/n degrees relative to each other, and wherein a first coupling section is connected to a next coupling section through a member, and wherein the $n^{th}$ coupling section is connected to the first coupling section through a member for forming a ring of n members.

8. Device according to claim 7, comprising a number of rings of members.

9. Device according to claim 7, further comprising a frame, a plurality of series of members interlinked through coupling sections and extending in different radial directions relative thereto, and a plurality of rings of members, wherein the rings of members at the locations of coupling sections thereof are connected to the coupling sections of the series of members extending in radial directions.

10. Device according to claim 7, further comprising a frame, a plurality of series of members interlinked through articulated connections and extending in different radial directions relative thereto, and a plurality of rings of members, wherein the rings of members at the locations of coupling sections thereof are connected to the articulated connections of the series of members extending in radial directions.

11. Device according to claim 7, comprising a frame, a plurality of series of members interlinked by articulated connections and coupling sections and extending in different radial directions relative thereto, and a plurality of rings of members, wherein the rings of members at the location of coupling sections thereof are connected to the coupling sections of the series of members extending in radial directions.

12. Device according to claim 1, comprising a frame and a plurality of series of members interlinked by coupling sections and extending in different radial directions relative thereto.

13. Device according to claim 12, further comprising at least a ring of members, wherein a ring comprises n (n>3) articulated connections and members, and wherein, for a ring, a first member is connected through an articulated connection to a next member, and wherein the $n^{th}$ member is connected through an articulated connection to the first member for forming the ring of n members wherein the series of members extending in the radial directions at the locations of coupling sections thereof are connected to articulated connections of the at least one ring of members.

14. Device according to claim 12, further comprising at least a ring of members, wherein a ring comprises n (n>3) articulated connections and/or coupling sections and n members, and wherein, for a ring, a first member is connected through an articulated connection or coupling section to a next member, and wherein the $n^{th}$ member is connected through an articulated connection or coupling section to the first member for forming the ring of n members wherein the series of members extending in the radial directions at the locations of coupling sections thereof are connected to coupling sections of the at least one ring of members.

15. Device according to claim 10, wherein the articulated connections are under spring preload to cause the members coupled thereto to articulate in a predetermined direction relative to each other.

16. Device according to claim 1, wherein the members in the area of the coupling sections are interlinked through a spring device.

17. Device according to claim 16, wherein the members are coupled together in the area of the coupling sections through an elongated, flexible and elastic strip, which is bent in a width direction thereof.

18. Device according to any of the preceding claims, wherein the member comprises a rod, a substantially rectangular frame, a solar panel, a reflecting surface, a fence, or a pipe.

19. Device according to claim 6, wherein the first hinge axis and the second hinge axis are directed at an angle between 5 and 90 degrees relative to each other.

20. Device according to claim 19, wherein the first hinge axis and the second hinge axis are directed at an angle between 5 and 60 degrees relative to each other.

21. Device according to claim 11, wherein the articulated connections are under spring preload to cause the members coupled thereto to articulate in a predetermined direction relative to each other.

22. Device according to claim 13, wherein the articulated connections are under spring preload to cause the members coupled thereto to articulate in a predetermined direction relative to each other.

23. Device according to claim 14, wherein the articulated connections are under spring preload to cause the members coupled thereto to articulate in a predetermined direction relative to each other.

* * * * *